(12) United States Patent
Haslam et al.

(10) Patent No.: US 11,423,133 B2
(45) Date of Patent: Aug. 23, 2022

(54) MANAGING TRAVEL DOCUMENTS

(71) Applicant: ASSA ABLOY AB, Stockholm (SE)

(72) Inventors: Robert Haslam, Hong Kong (CN); Stephen Kelly, Welwyn (GB); Philip Hoyer, Richmond (GB); Stephen Warne, Byfield (GB)

(73) Assignee: ASSA ABLOY AB, Stockholm (SE)

( * ) Notice: Subject to any disclaimer, the term of this patent is extended or adjusted under 35 U.S.C. 154(b) by 286 days.

(21) Appl. No.: 16/479,006

(22) PCT Filed: Dec. 27, 2017

(86) PCT No.: PCT/IB2017/001732
§ 371 (c)(1),
(2) Date: Jul. 18, 2019

(87) PCT Pub. No.: WO2018/134639
PCT Pub. Date: Jul. 26, 2018

(65) Prior Publication Data
US 2019/0354665 A1 Nov. 21, 2019

Related U.S. Application Data

(60) Provisional application No. 62/455,067, filed on Feb. 6, 2017, provisional application No. 62/447,981, filed on Jan. 19, 2017.

(51) Int. Cl.
*G06F 21/34* (2013.01)
*G06F 21/33* (2013.01)
(Continued)

(52) U.S. Cl.
CPC ............. *G06F 21/34* (2013.01); *G06F 21/33* (2013.01); *G06F 21/602* (2013.01); *G06F 21/6209* (2013.01); *H04W 4/029* (2018.02)

(58) Field of Classification Search
CPC ........ G06F 21/34; G06F 21/33; G06F 21/602; G06F 21/6209; H04W 4/029
See application file for complete search history.

(56) References Cited

U.S. PATENT DOCUMENTS 8,768,294 B2 * 7/2014 Reitnour ................. H04W 4/90
455/457
8,903,870 B2 * 12/2014 Turk .................... G06Q 50/265
707/803

(Continued)

FOREIGN PATENT DOCUMENTS

WO WO-2018134639 A1 7/2018

OTHER PUBLICATIONS

Rahman et al. 2012 "Location Based Early Disaster Warning andEvacuation System on Mobile Phones Using OpenStreetMap", 2012 IEEE Conference on Open Systems, 6 pages (Year: 2012).*

(Continued)

*Primary Examiner* — Catherine Thiaw
(74) *Attorney, Agent, or Firm* — Schwegman Lundberg & Woessner, P.A.

(57) ABSTRACT

Maintaining information for a traveler includes creating a virtual travel credential containing information from a physical passport of the traveler and/or physical travel document(s) of the traveler, storing at least a portion of the virtual travel credential in a mobile device carried by the traveler, monitoring a location of the mobile device, and providing a signal in response to the mobile device transitioning from a first country/territory to a second country/territory. Monitoring the location of the mobile device may include detecting a cellular network in communication with the mobile device or using GPS functionality of the mobile device or receiving information that the traveler boarded a plane headed for the second country/territory. At least a portion of the virtual travel credential may be stored in a (Continued)

virtual travel credential server. The virtual travel credential server may communicate with the mobile device using a cellular network.

20 Claims, 16 Drawing Sheets

(51) Int. Cl.
  *G06F 21/60* (2013.01)
  *G06F 21/62* (2013.01)
  *H04W 4/029* (2018.01)

(56) References Cited

U.S. PATENT DOCUMENTS

| | | | |
|---|---|---|---|
| 9,367,217 B2* | 6/2016 | Moore, Jr. | G06Q 10/02 |
| 9,721,147 B1* | 8/2017 | Kapczynski | G06Q 50/265 |
| 2010/0203868 A1* | 8/2010 | Sagie | G06Q 30/04 |
| | | | 455/414.1 |
| 2010/0240339 A1* | 9/2010 | Diamond | H04W 4/90 |
| | | | 455/404.2 |
| 2012/0090038 A1 | 4/2012 | Pacella et al. | |
| 2012/0109721 A1* | 5/2012 | Cebon | G06Q 30/06 |
| | | | 705/13 |
| 2014/0162598 A1* | 6/2014 | Villa-Real | G06Q 20/363 |
| | | | 455/411 |
| 2014/0372154 A1* | 12/2014 | Scott | G06Q 50/14 |
| | | | 705/5 |
| 2015/0088778 A1* | 3/2015 | Tsao | G06Q 50/265 |
| | | | 705/325 |
| 2015/0105105 A1* | 4/2015 | Van Heerden | H04W 8/18 |
| | | | 455/456.3 |
| 2015/0163626 A1* | 6/2015 | Zimmer | H04W 4/02 |
| | | | 455/404.2 |
| 2015/0286984 A1* | 10/2015 | Dikman | G06Q 10/087 |
| | | | 705/28 |
| 2016/0294831 A1 | 10/2016 | Borunda et al. | |
| 2016/0380774 A1 | 12/2016 | Lovelock et al. | |
| 2017/0032485 A1* | 2/2017 | Vemury | G06Q 50/265 |
| 2017/0324750 A1* | 11/2017 | Khan | H04L 9/3247 |
| 2018/0068399 A1* | 3/2018 | Feinberg | G06Q 50/14 |

OTHER PUBLICATIONS

Peter A. Leggat and Mathew Klein "Personal Safety Advice for Travelers Abroad", J Travel Med 2001; 8:46-51. (Year: 2001).*

Shivani Kundra, Aman Dureja, Riya Bhatnagar "The study of recent technologies used in E-passport system" 2014 IEEE Global Humanitarian Technology Conference—South Asia Satellite (GHTC-SAS) | Sep. 26-27, 2014 | Trivandrum (Year: 2014).*

"International Application Serial No. PCT/IB2017/001732, International Preliminary Report on Patentability dated Aug. 1, 2019", 8 pgs.

"European Application Serial No. 17842420.6, Communication Pursuant to Article 94(3) EPC dated Apr. 30, 2020", 6 pgs.

"European Application Serial No. 17842420.6, Response filed Sep. 7, 2020 to Communication Pursuant to Article 94(3) EPC dated Apr. 30, 2020", 8 pgs.

"International Application Serial No. PCT/IB2017/001732, International Search Report dated Jun. 6, 2018", 3 pgs.

"International Application Serial No. PCT/IB2017/001732, Written Opinion dated Jun. 6, 2018", 6 pgs.

"European Application Serial No. 17842420.6, Response filed Sep. 9, 2021 to Summons to Attend Oral Proceedings mailed May 19, 2021", 17 pgs.

"European Application Serial No. 17842420.6, Summons to Attend Oral Proceedings mailed May 19, 21", 8 pgs.

* cited by examiner

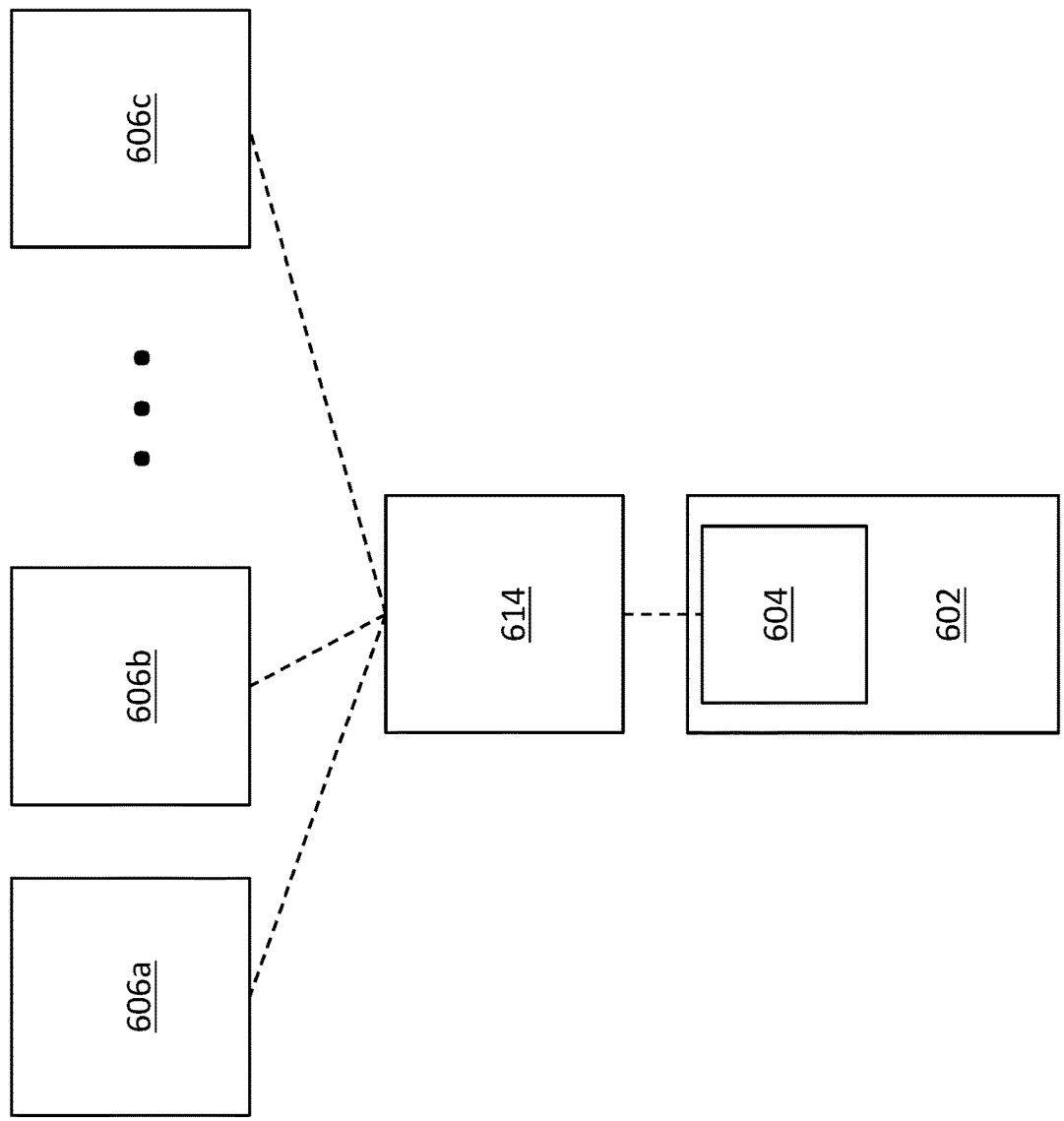

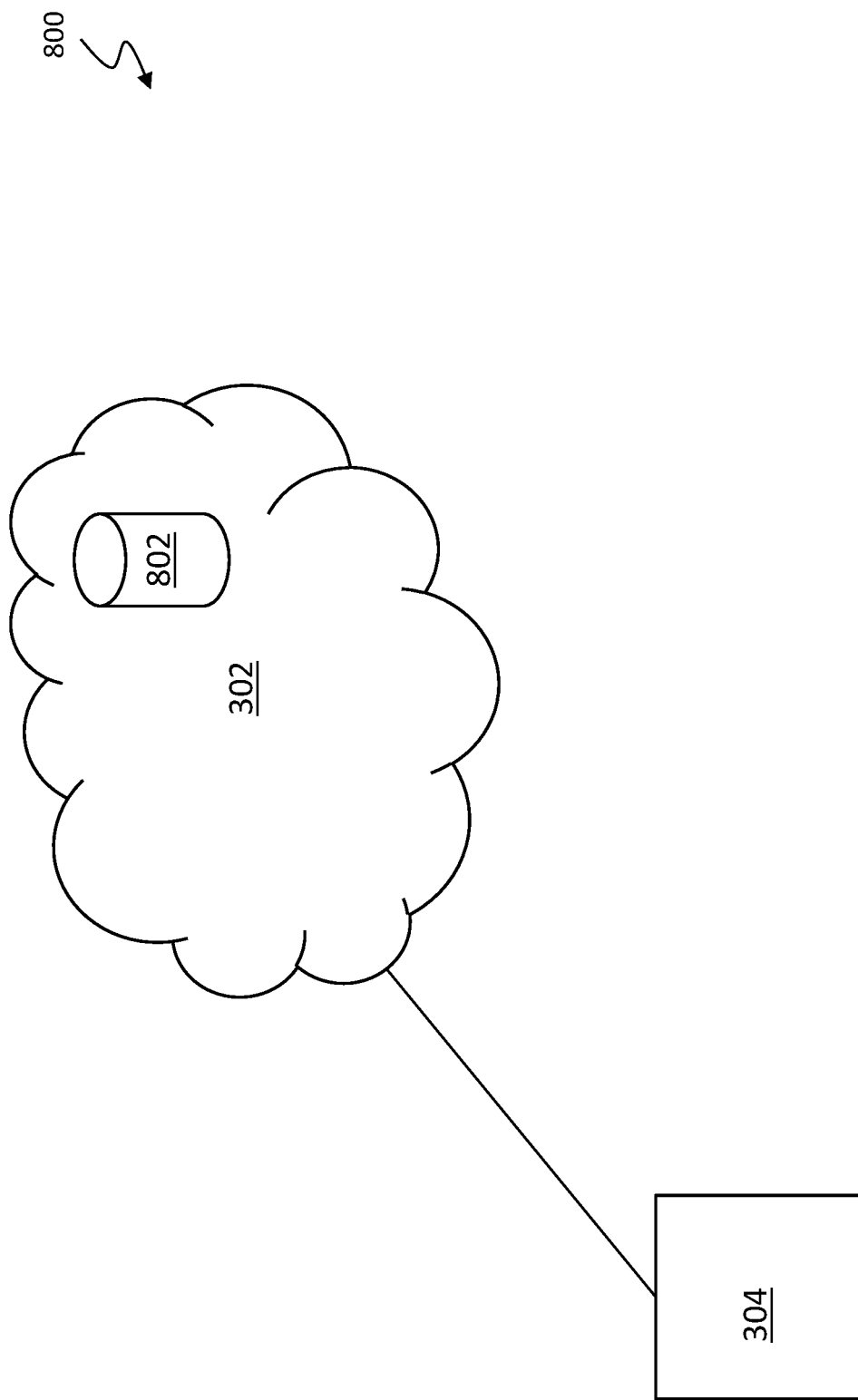

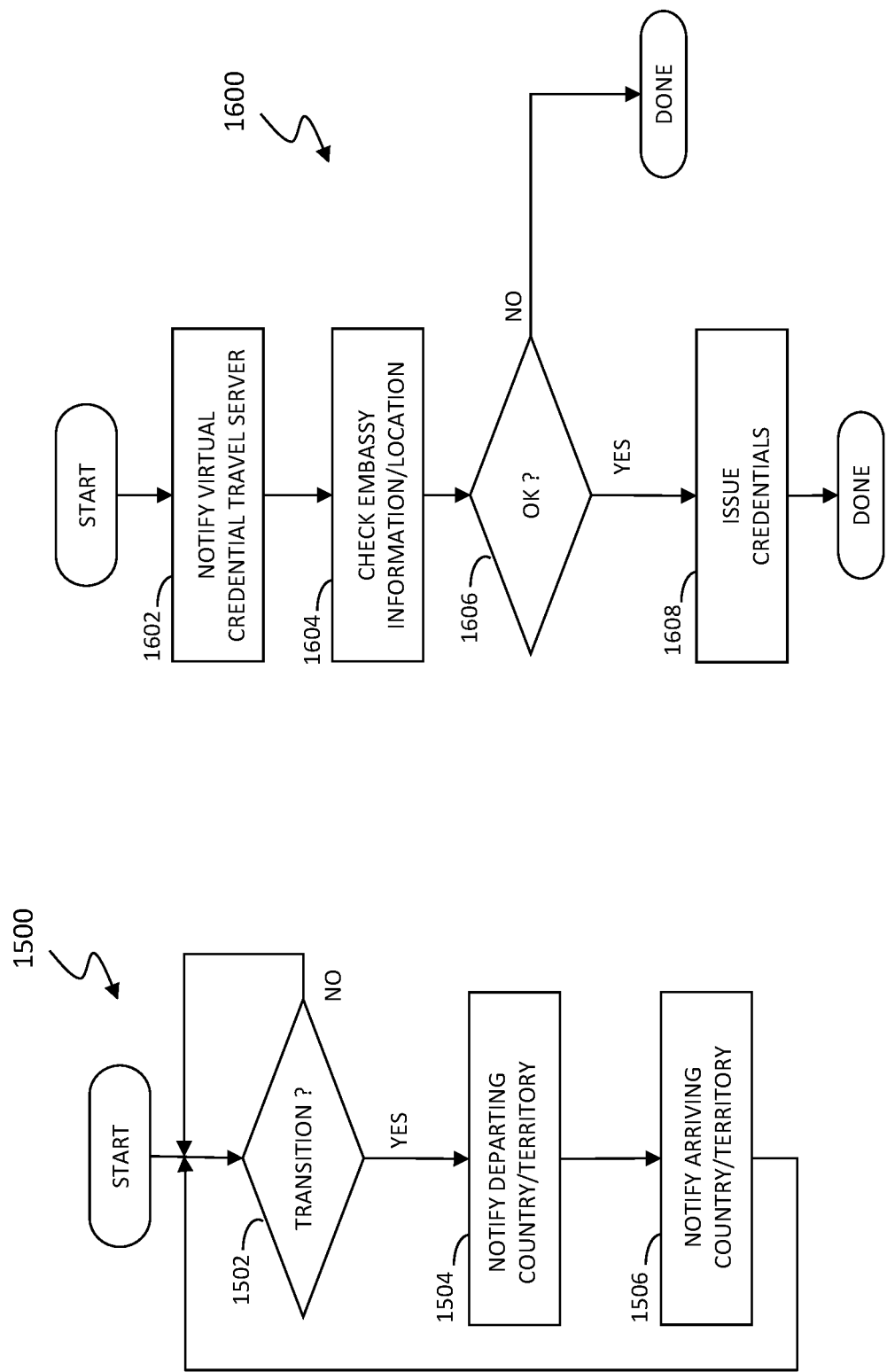

MANAGING TRAVEL DOCUMENTS

CROSS-REFERENCE TO RELATED APPLICATIONS

This application is a U.S. National Stage Filing under 35 U.S.C. § 371 from International App. No. PCT/IB2017/001732, filed on Dec. 27, 2017, and published as WO 2018/134639, entitled "MANAGING TRAVEL DOCUMENTS," which claims priority to U.S. Prov. App. No. 62/447,981, filed on Jan. 19, 2017, entitled "PHYSICAL/VIRTUAL PASSPORT SYSTEM" and to U.S. Prov. App. No. 62/455,067, filed on Feb. 6, 2017, entitled "PHYSICAL/VIRTUAL TRAVEL DOCUMENT SYSTEM INCLUDING EMERGENCY AND TEMPORARY TRAVEL DOCUMENTS", each of which is hereby incorporated by reference herein in its entirety.

TECHNICAL FIELD

This application relates to the field of credentials and licenses and more particularly to the field of providing virtualized mobile credentials and licenses.

BACKGROUND OF THE INVENTION

Passports and other travel document(s), such as travel visas, allow holders thereof (travelers) to enter and leave different countries/territories. A traveler entering a particular country presents his or her passport to authorities at a border that inspect the passport and, if everything checks out, the traveler is allowed entry. The passport can establish identity and citizenship of the traveler. Authorities at a border crossing point can use the identity information to both confirm that there are no prohibitions against allowing the traveler into the country/territory and that the country of origin allows the traveler to travel abroad.

A problem with physical passports and travel documents is that losing them results in significant inconvenience. In many instances, the traveler can obtain either a replacement or temporary travel documents at an embassy corresponding to a home country of the traveler. For example, an American that lost his passport in France could obtain a replacement or temporary travel documents at the American embassy in France. Of course, an embassy does not issue replacement documents without first verifying the identity of the person requesting new documents. However, in many cases, a traveler that has lost their passport has also lost other identification (e.g., driver's license) because the passport and the other identification were kept in the same place. For instance, a traveler may lose their handbag containing the traveler's passport and containing the traveler's wallet with the driver's license therein. In such a case, an embassy may eventually be able to use other means to establish identity of a citizen, such as obtaining reliable records from government agencies in the citizen's home country. However, doing so may be exceptionally time consuming and of course, there is always a possibility of fraud, especially since a person claiming to have lost their passport, license, etc. will not have a photo ID.

Accordingly, it is desirable to provide a mechanism that facilitates issuing replacements or temporary documents of passports or other travel documents.

SUMMARY OF THE INVENTION

According to the system described herein, maintaining information for a traveler includes creating a virtual travel credential containing information from a physical passport of the traveler and/or physical travel document(s) of the traveler, storing at least a portion of the virtual travel credential in a mobile device carried by the traveler, monitoring a location of the mobile device, and providing a signal in response to the mobile device transitioning from a first country/territory to a second country/territory. Monitoring the location of the mobile device may include detecting a cellular network in communication with the mobile device or using GPS functionality of the mobile device or receiving information that the traveler boarded a plane headed for the second country/territory. At least a portion of the virtual travel credential may be stored in a virtual travel credential server that is separate from the mobile device. The virtual travel credential server may communicate with the mobile device using a cellular network. The virtual credential travel server may provide the signal in response to the mobile device transitioning from the first country/territory to the second country/territory. The signal may be provided to the embassy in the second country/territory. In response to the traveler losing the physical passport or the physical travel document(s), the embassy of the second country/territory may issue a replacement after receiving the signal and confirming that the signal indicates that the traveler is located in the second country/territory.

According further to the system described herein, a non-transitory computer readable medium contains software that maintains information for a traveler. The software includes executable code that implements the method of one of claims 1-9.

The system described herein provides a mechanism by which a specific credential, such as a driver's license either on a physical card or a mobile phone, might release different information depending if a validation device asking for the data held on the credential is online or offline, thus speeding up a verification process and augmenting privacy by only releasing a minimum amount of information needed in the specific verification transaction.

The system described herein provides a secure method by which a verifying device can indicate to a credential the verifying device is trying to verify if the verifying device has such online capability and hence allows the secure online retrieval of the credential data instead of from the credential itself may dramatically improve the verification user experience. The same credential can also be verified by an offline verification device. The credential hence can selectively release data depending on the online/offline capability of the verification device.

User identity information could be anything that has a user's name and address, such as a QR code (QC code), image with watermark, etc. that is tied to a license, such as a driver's license, but also other types of licenses, such as a contracting licenses. The licensing information may be tied to insurance associated with that license. The licensing information may be displayed (read via wireless communication or by taking a photo of the information) from a cell phone of the holder, and delivered to a cell phone (ipad, etc.) of a receiver. The identity of the holder could optionally come from a web page where a service provided by the holder is requested (possibly a service of the license issuer), or from an email from the holder or from a proxy (for example confirming an appointment for requested service) to allow the receiver to preview credentials of the provider.

The system described herein may use the cloud to translate identity of a user with an associated license. An id may include a virtual identity from a licensing board that also indicates where to retrieve an actual license, and any required access method information. Input of the user optionally includes a release from the providing party (possibly in the form of an access token) to allow the relying party to read the license/insurance data and/or access the license/insurance data from the cloud or possibly some other source. The id and associated data may include an encrypted dynamic element to prevent a replay attack.

The relying party (possibly a police officer, or service provider such as a rental car agent) may receive on their cell phone (or a local display) a copy of the (drivers/auto) license, and any associated insurance and other data used by the receiver to validate the license holder, such as a biometric reference template. The received data is converted into graphical image(s) of the license which are displayed to a relying party. The graphical image(s) might be abbreviated in the case of poor communication lines or a small display. The format or content of an output may vary based on a wide range of conditions including the device type of the receiver, the role of the receiver and contextual data about the receiver such as geolocation. Optionally, the receiver may present their mobile device (i.e cell phone) for the license holder to present biometric input for validation, such as a fingerprint, iris scan, facial recognition, etc.

The system described herein provides for retrieval and verification of a virtualized license (or licenses) that are mastered within a central repository and which can be displayed on a smart device such as mobile phone. The identity of a user whose license is to be verified may be presented by the user on a mobile device of the user to a device (e.g., phone) of a relying party. The phone of the relying party may capture identity of the user using a camera on the phone of the relying party.

BRIEF DESCRIPTION OF THE DRAWINGS

Embodiments of the system described herein are explained with reference to the several figures of the drawings, which are briefly described as follows.

FIGS. 6A and 6B are schematic illustrations showing a verifying device containing a verification app that communicates with one or more verification services according to embodiments of the system described herein.

FIGS. 8A and 8B are schematic illustrations showing a license holder device a communications/cloud infrastructure and possibly a relying party device according to alternative embodiments of the system described herein.

FIG. 15 is a flow diagram illustrating processing performed in connection with a mobile device providing travel notification according to an embodiment of the system described herein.

FIG. 16 is a flow diagram illustrating processing performed in connection with obtaining replacement/temporary travel documents and/or a passport according to an embodiment of the system described herein.

DETAILED DESCRIPTION OF VARIOUS EMBODIMENTS

The system described herein provides a mechanism for tracking travelers and for facilitating issuing replacement or temporary versions of passports and/or other travel document(s) (e.g., travel visas).

Figure 1:
FIG. 1 is a schematic illustration showing a screen with driver's license information thereon according to an embodiment of the system described herein.

Referring to FIG. 1, a screen 100 is provided on a device, such as a smartphone, a tablet, etc. The screen 100 provides driver's license information, including date of birth, expiration, name, address, driver's license number, and a photograph of the owner of the driver's license. The driver's license information may include information that is found in standards such as the American Association of Mother Vehicle Administrators DL/ID Card Design Standard published in August 2013 and available from http://www.aamva.org/DL-ID-Card-Design-Standard/. Any appropriate information/data may be provided as driver's license information, including a QR code (QC code), an image with watermark, etc. that is tied to the driver's license. In some cases, automobile insurance information may be associated with the driver's license. The driver's license holder may input some or all of the information and/or another entity/party (e.g. state registry of motor vehicles) may enter some or all of the information. Note also that, although the system described herein is illustrated in connection with a driver's license, other types of licenses may be used instead and, in fact, other types or credentials/documents/authorizations may be used, such as a county hunting license, a city contractor licenses (plumber, electrician, etc.), a certificate of insurance, etc. Thus, the discussion of licenses, license holders, etc. herein should be understood to include, generically, any appropriate type of credentials, credential holders, etc. In some cases, it may be possible to combine different licenses, authorizations, credentials, etc. It is also possible to have a single instance that corresponds to all licenses, authorizations, credentials, etc. of a particular user.

The screen 100 may correspond to a display on a device of the license holder and may be viewed by the license holder either upon request or possibly in connection with the license holder providing a password, fingerprint, and/or some other type of authentication. Alternatively, the screen 100 may correspond to a screen on a device of a party other than the license holder (e.g., police officer, car rental agent, etc.) and the information provided on the screen 100 may be provided with or without the consent of the license holder, as described in more detail elsewhere herein. In some cases, information provided to a party other than the license holder may include an indication of what the license holder used to validate/authorize a particular request. The screen 100 may provide information that identifies the license holder, such as a social security number of the license holder (possibly embedded within a QR/QC code), an image of a passport of the license holder, a picture id that contains a name and address of the license holder, an image of a driver's license of the license holder, an image of an auto license plate of the license holder, etc.

Figure 2:
FIG. 2 is a schematic illustration showing a screen with a subset of driver's license information thereon according to an embodiment of the system described herein.

Referring to FIG. 2, a screen 200 provided on a device is similar to the screen 100, discussed elsewhere herein, except that the screen 200 does not include all of the information provided on the screen 100. In some embodiments, the screen 200 may be presented on a device of the license holder in response to a specific input by the license holder to hide some of the information. For example, if the license holder uses the device/license to purchase liquor, the photograph, date of birth, and driver's license number may be useful, but the home address of the license holder is not necessary and, in some cases, the license holder may wish to prevent another party, such as a bartender, from seeing a home address of the license holder. Note that, instead of data of birth, it may be possible to provide (i.e., by default) just an indicator that the license holder is over 21. The license holder may control on an ad hoc basis which data is presented. For instance, the license holder may make a selection on their device not to display/send a home address when a relying party is, for example, a bartender.

In some cases, the role of a relying party may be provided to the license holder (i.e., electronically) and the information provided to the relying party may depend upon the role of the relying party. For example, if the relying party has a role of "law enforcement", then more information (e.g., home address) may be provided to the relying party than would be provided to a relying party having a role of "bartender". Note that there may be other types of roles, including "non-profit service provider" (such as teachers/instructors), "passport control", service providers acting on behalf of others (i.e. airline staff acting as preliminary passport control), regulatory personnel, etc. In some cases, the role information may be provided in a format that can be verified (e.g., digitally signed or otherwise be derived via a process of mutual authentication where the relying party is authenticated to the license holder along with some role identifying attributes that are sent via the mutual authentication). Using a format that can be verified prevents, for example, the license holder from authorizing information to be provided to someone fraudulently posing as a member of law enforcement. Mechanisms to verify the relying party are discussed in more detail elsewhere herein.

In some cases, particular information that is provided to the relying party may be a function of a role of a relying party and a distance between the relying party and the license holder, where different roles result in different maximum distances for authorizing providing information. For example, if the relying party has a role of "law enforcement", then the information may be provided to the relying party up to a distance of fifteen meters whereas if the relying party has a role of "bartender", the information may be provided only be up to three meters distance.

It is also possible to provide or not provide specific information based on contextual data, such as geolocation of the license holder and/or relying party, where, for example, a photograph of the license holder is not provided in locations where photographs are discouraged for religious reasons. Note that, in some cases, a subset of information is provided due to limitations in communication and/or of the receiving device, for example, in instances communication bandwidth limitations might cause any provided graphic image to be abbreviated (reduced in size/resolution).

Alternatively, license holder information may be transmitted to a device of a party other than the license holder so that, for example, the screen 200 is provided on a device of a bartender that needs to determine if it is appropriate to serve alcohol to the license holder. The amount and type of information provided to a relying party may be controlled so that different parties receive different information according to a roll of the relying party. For example, a relying party having a role of "law enforcement" may be provided with all of the driver's license information while a relying party having a role "commercial service provider" may be provided with a subset of the information that does not include the home address of the driver's license holder. The license holder may control on an ad hoc basis which data is sent to a recipient. For instance, the license holder may make a selection on their device not to display/send a home address when the relying party is, for example, a bartender, even if the relying party does not send role information to the device of the license holder. In some instances, the subset information provided may vary according to contextual data corresponding to a privacy level setting so that, for example, in some cases an actual data of birth is provided while in other cases only an indication that the license holder is over 21 is provided.

Figure 3:
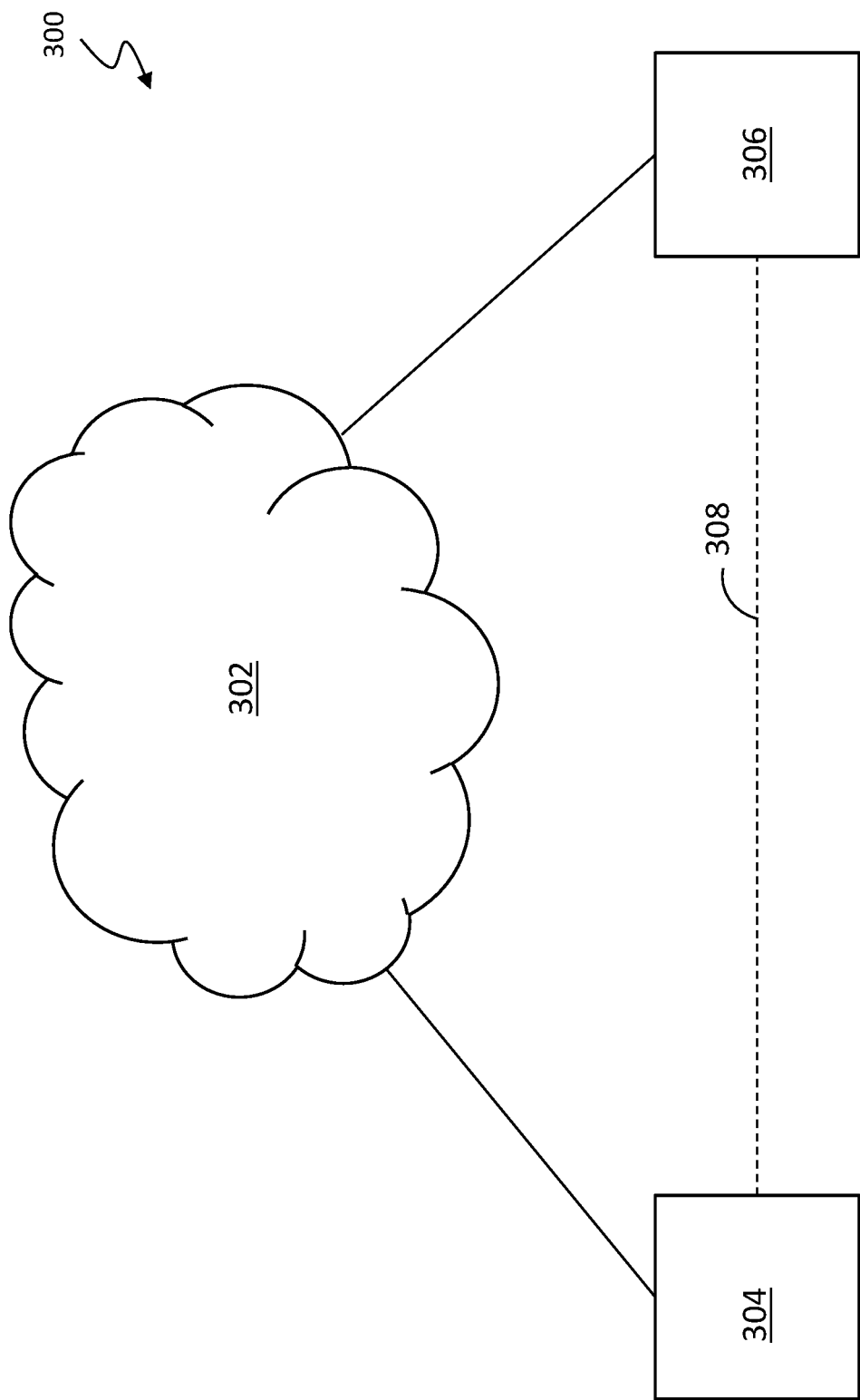
FIG. 3 is a schematic illustration showing a license holder device, a relying party device and a communications/cloud infrastructure according to an embodiment of the system described herein.

Referring to FIG. 3, a diagram 300 shows a network/cloud infrastructure 302, a license holder device 304, and a relying party device 306. The infrastructure 302 represents both communication mechanisms between the devices 304, 306, such as a cellular telephone network, and represents storage/processing that may be performed on behalf of the devices 304, 306. For example, information about the license holder (virtualized credentials) may be stored in cloud storage (the infrastructure 302) and then conveyed to the relying party device 306 upon occurrence of a particular event, such as the license holder entering a password, fingerprint (or similar) on the license holder device 304 to authorize transferring information from the cloud to the relying party device. It is also possible for the event to be simply close proximity of the devices 304, 306. For example, if the relying party is a law enforcement official, then it is possible to have the infrastructure 302 provide information about the license holder to the relying party device 306 in response to the license holder device 304 becoming proximate to the relying party device 306. Thus, for example, a bartender may gather together a group of N (for example 5) individuals (all within device proximity limitations), receive N notifications that each is authorized (over 21), and allow access to the facility to all of the individuals in the group.

In other embodiments, information may be transferred from the license holder device 304 to the relying party device 306 either through the infrastructure 302 or via a more direct link 308 therebetween. Note that the link can be any type of data communication mechanism, such as an Internet connection, WiFi, a Bluetooth connection, etc. In some embodiments, the devices 304, 306 may be connected to each other using a physical wire, such as an electrical wire, a Fiber-optic link, etc. Any appropriate type of contact, contactless, or proximity connection may be used. Information may be conveyed between the devices 304, 306 upon occurrence of a particular event, such as the license holder entering a password, fingerprint (or similar) on the license holder device 304 to authorize transferring information from the cloud to the relying party device close proximity of the devices 304, 306, as discussed elsewhere herein.

In some instances, the device 306 may be a laptop or desktop computer (or similar) and information may be provided to a relying party via a Web page (or similar) that the relying party accesses, possibly only after the license holder provides authorization. It is also possible to provide information to the relying party via an email that is sent by the license holder or by a proxy, possibly after authorization of the license holder. Note that, in some cases, it is possible for a relying party to not have a device at all but, instead, to visually inspect the license holder device 304 and/or take a photograph of the screen thereof.

Figure 4:
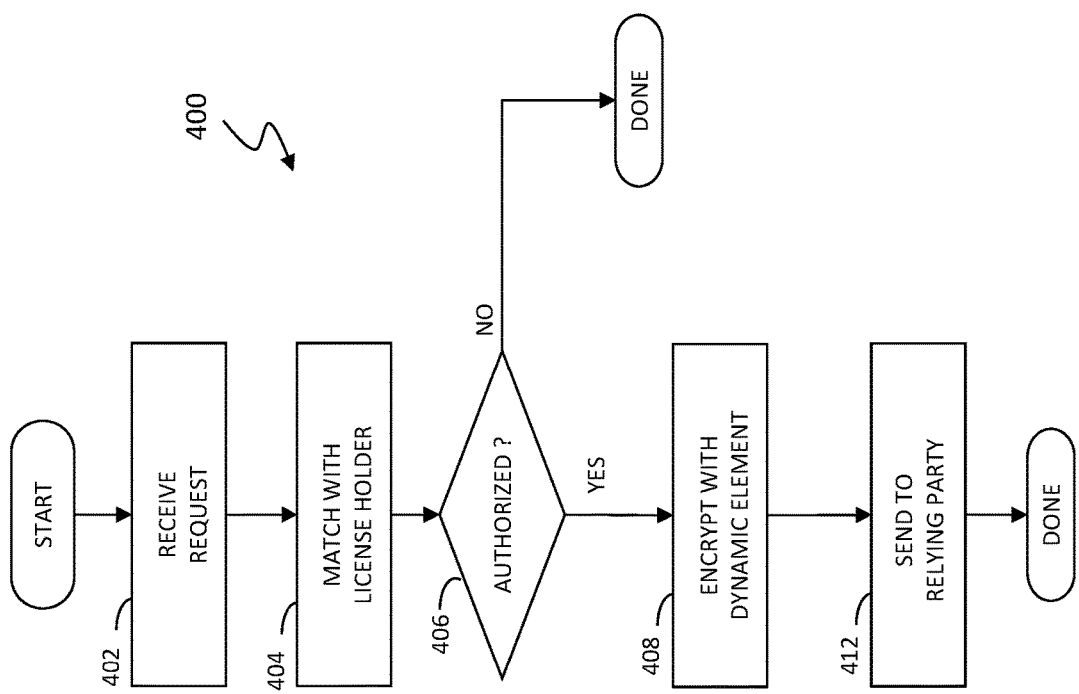
FIG. 4 is a flow diagram illustrating processing performed by a communications/cloud infrastructure according to an embodiment of the system described herein.

Referring to FIG. 4, a flow diagram 400 illustrates steps performed in connection with the communications/cloud infrastructure 302 providing information to a relying party. Processing begins at a first step 402 where a request is received. In some embodiments, the relying party requests the information from a license holder so the request received at the step 402 is from the relying party. In other embodiments, the request may be provided by the license holder to send the information to the relying party so that the request received at the step 402 is from the license holder. In either case, the request may include one or more tokens, or similar, which is a data element that contains information about the license holder but does not directly identify the license holder (and may or may not directly identify the relying party).

In instances where an identity is indirectly tied to the license holder, an external database may map a token to the identity of the license holder. The external database/data used for mapping may be separate from any other database/data containing personal information about the license holder. Following the step 402 is a step 404 where the token(s) are matched by the infrastructure 302 to information for the license holder and/or the relying party. In some cases, the token(s) may indicate where to retrieve the requested license information and possibly required access information (i.e., credentials for remote systems that are accessed). Following the step 404 is a test step 406 where it is determined if the request is authorized. As discussed elsewhere herein, it may be necessary for the license holder to provide authorization in the form of a password, fingerprint, etc. In some cases, the license holder may need to provide a release (possibly in the form of an access token) to authorize the relying party to read the license information and/or access license information from the cloud, including possibly information about insurance. Note that authorization may include having the relying party (e.g., a police officer) present their device to the license holder who then provides a password, a fingerprint, etc. to the device of the relying party. As discussed in more detail elsewhere herein, there may be mechanisms to ensure authorization/identity of the relying party.

If it is determined at the 406 that the request is not authorized, then processing is complete (i.e., no information will be provided or only information indicating that the request was not authorized). Otherwise, control transfers from the test step 406 to a step 408 where the requested information is encrypted with a dynamic element (to guard against replay attacks). Following the step 408, control transfers to a step 412 where the requested information is sent to the relying party. Following the step 412, processing is complete.

Figure 5:
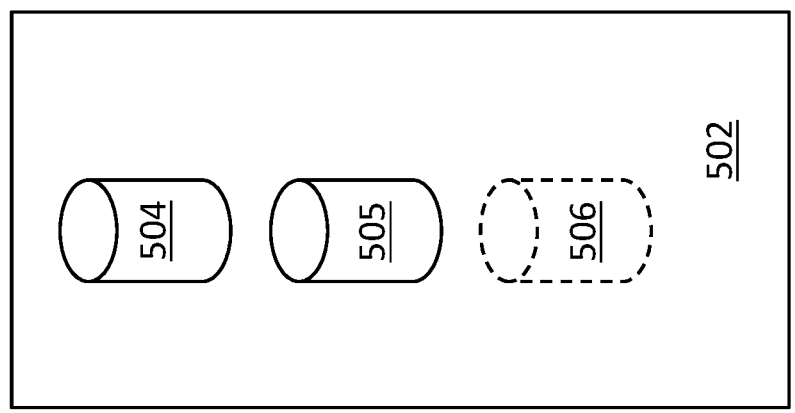
FIG. 5 is a schematic illustration showing a license holder device containing license/credential information, an authentication cryptogram, and possibly policy information according to an embodiment of the system described herein.

Referring to FIG. 5, a mobile device 502, such as a smartphone, includes a cryptograph key 504 (possibly a unique cryptographic key) that is securely provisioned in the mobile device 502. The mobile device 502 may be used by a license holder in connection with the system described herein. The cryptographic key 504 may be a symmetric key or part of an asymmetric private/public key pair. The mobile device 502 also includes license data 505 that contains information for license(s)/credentials (virtualized credentials) provided with the mobile device 502. The license data 505 may include one or more visual images of the license holder that are displayed on the mobile device 502 as well as information and/or graphical images for indicating information associated with the license(s)/credentials, such as date of birth, specific authorizations, etc.

The mobile device 502 may optionally include policy data 506, which provides information regarding operation/use of the corresponding license(s)/credentials. For example, the policy data 506 may include information that causes home address information for the license holder to be withheld if the relying party has a role of "bartender". Other policy information may indicate whether it is permissible to have the license data 505 stored on other devices in addition to the mobile device 502. Note that, as discussed elsewhere herein, it is possible for some or all of the policy information for the license data 505 and corresponding virtual license(s) to be stored elsewhere, such as in the network/cloud infrastructure 302, discussed elsewhere herein.

The cryptographic key 504 may be used (e.g., by the mobile device 502) to generate a cryptogram that validates the license data 505. In an embodiment herein, a relying party may use the cryptogram to ensure that the license holder is presenting valid data. For example, if the license data 505 corresponds to a motor vehicle license, then the cryptogram may include the license data digitally signed with the cryptographic key 504, which may be a private key corresponding to a public key of an issuing authority, such as a state motor vehicle department. In another embodiment, the cryptogram may include a private key corresponding to a public/private key pair specific to the license with a public license key additionally signed by an issuing authority and a public key of the issuing authority attached, concatenated or stored with the public license key. Note that it is possible to use any appropriate cryptographic information associated with the license holder to generate the cryptogram. Thus, for example, instead of the cryptographic key 504 stored on the mobile device 502, it is possible to use other information associated with the license holder, but stored in another location, such as in the cloud, to generate the cryptogram.

A relying party, such as a police officer, may then validate the license data by applying the public key to the cryptogram which results in the license data 505 if the license data 505 is valid. Other values/information may be used with the cryptographic key 504 to generate the cryptogram, such as an event counter, a time stamp, a nonce, etc. Other possible values/information include a unique identifier for the virtual license, a unique identifier for a user identifier that is mapped to the virtual license, an indicator of a particular type (e.g., driver's license, fishing license, etc.) of the virtual license/credential, one or more identifiers that collectively describe or identify service(s) that may be used to verify the authenticity of the virtual license/credential (i.e., a verification service), an identifier of a party that issued the virtual license/credential, etc.

In some instances, the same license data 505 may be provided on multiple devices, but each of the devices may have a different cryptographic key. Of course, it is also possible for some or all of the multiple devices to use the same cryptographic key. In some cases, the cryptographic key 504 may only be valid for a finite amount of time after which a replacement cryptographic key is provided. Information regarding operation, limits, range, etc. of the cryptographic key 504 may be provided by the policy data 506. The cryptogram may be regenerated (changed to an unpredictable value) for each verification to prevent a replay.

The mobile device 502 may provide information to a different device (not shown in FIG. 5) for validation. The different device may be a mobile device of a relying party. In some embodiments, the cryptogram 504 and possibly some or all of the license data 505 and possibly some or all of the policy data 506 may be encoded within a bar code that is displayed on the mobile device 502. The relying party may then take a photo of the bar code or otherwise visually input the bar code for verification. In another embodiment, the cryptogram 504 and possibly some or all of the license data 505 and possibly some or all of the policy data 506 may be encoded into a digital watermark within an image of the virtual license displayed on the device 502. The relying party may then take a photo of the image with the watermark or otherwise visually input the image with the watermark for verification. Generally, the cryptogram 504 and possibly some or all of the license data 505 and possibly some or all of the policy data 506 may be encoded into a visual image that is provided to a device of the relying party. In other embodiments, the cryptogram 504 and possibly some or all of the license data 505 and possibly some or all of the policy data 506 may be communicated to the relying party using NFC, Bluetooth, or similar. It is also possible for the cryptogram 504 and possibly some or all of the license data 505 and possibly some or all of the policy data 506 to be communicated to the relying party via a non direct channel, such as email or SMS.

Figure 6A:
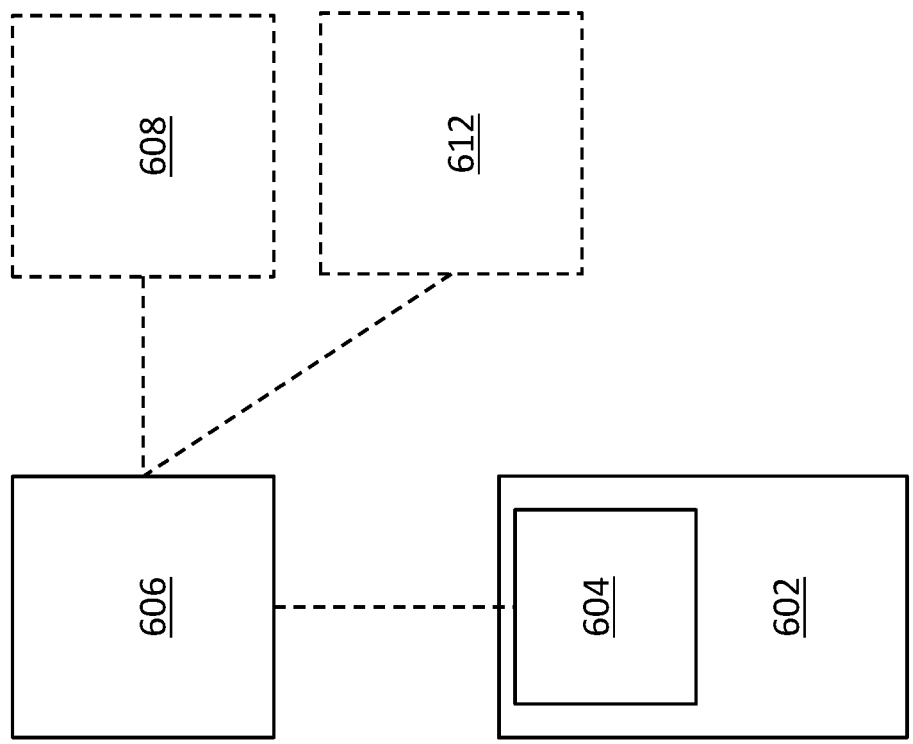

Referring to FIG. 6A, a device 602 (verifying device) of a relying party has received from a license holder information that requires validation (e.g., the cryptogram 504 and possibly some or all of the license data 505 and possibly some or all of the policy data 506). The device 602 may be a mobile device, such as a smartphone, that runs a verification app 604 to verify the received information. The verification app 604 may receive the information that requires validation and may then determine a URL of a validation service 606 (separate from the device 602) capable of verifying the information that requires validation. After determining the verification service 606, the verification app 604 may invoke the verification service 606 by transmitting the information that requires validation (including, in some cases, the cryptogram) to the verification service 606. Invocation of the verification service 606 may be logged by the verification service 606, providing an auditable record of each verification request. The verification service 606 may validate the information that requires validation and respond with a verified version of the license data 505, an image corresponding to an image from the license data 505, or some other data. Note that, in some cases, the verification service 606 may return an indication that the information is not valid. Information may not be valid for any number of reasons, such as the information being fraudulent. In some cases, the information may be deemed not valid by the verification service 606 for other reasons, such as expiration of a license.

The data/image returned by the verification service 606 to the verification app 604 may depending on a number of factors, including, possibly, information provided by the policy data 506, the type of license (e.g., driver's license, fishing license, etc.), the role of the relying party (e.g., police officer, bartender, etc.), and/or other contextual information that may be provided by the verification app 604 to the verification service 606. Note that some or all of the contextual information may be generated by the device 602 and/or provided to the verification app 604 by other local devices, separate from the device 602 (and possibly separate from the device 502 of the license holder), such as Bluetooth beacons or RFID tags. In some cases, contextual information may include speed information for an Internet connection used by the device 602, which may allow adjustment of volume of data, image formats, etc. returned by the verification service 606. Similarly, the verification app 604 may identify whether the verification app 604 is running on a laptop or mobile phone (i.e., whether the device 602 is a laptop or mobile phone), which may allow adjustment of volume of data, image formats, etc. returned by the verification service 606.

In some embodiments, the verification app 604 may be able to provide evidence of the trustworthiness of the endpoint device on which the verification app 604 is executing. For example, the verification app 604 may indicate that the device 602 been "jail broken" or that the verification app 604 is being executed in a trusted environment, such as Samsung Knox device. The level of trustworthiness may allow adjustment of a type of data returned by the verification service 606. In some cases, there may be multiple different implementations/configurations of the verification app 604 so that the verification service 606 returns one data set to a version of the verification app 604 that is used exclusively by police officers and returns another, different, data set to a different version of the verification app 604 that is optimized for use by park rangers or optimized for use by bar staff to verify proof of age or used by homeowners to verify a contractor license and retrieve insurance details. In some embodiments, a particular data set that is returned by the verification service 606 may vary depending on a physical location of the device 602 executing the verification app 604 or on a time of day. If the verification service 606 is not able to respond in real time to the verification app 604, the verification service 606 may process a request from the verification app 604 offline and issue, at a later date, a notification to the verification app 604 containing the requested verification information. Mechanisms for verifying authorization/identity of devices used by the relying party and the license holder are discussed in more detail elsewhere herein.

The verification app 604 may parse images and/or data returned by the verification service 606 and highlight contextually relevant aspects for a relying party using the device 602. For example, if the verification app 604 is used for a hunting license, the verification app 604 may indicate whether the license is valid for a location at which verification is taking place. As another example, the verification app 604 may be used by bar staff and thus may highlight to the relying party if the license holder is not old enough to drink alcohol. As yet another example, the verification app 604 may be used by a police officer and therefore may be capable of performing a biometric match such as a facial recognition, iris scan, and/or fingerprint check, by comparing a photo or fingerprint taken by the officer with image/data information returned by the verification server. The verification app 604 may provide an option for a relying party to record a result of a successful or unsuccessful verification. The result may be recorded on the verification server 606, a different server 608, and/or with the verification app 604.

The verification service 606 need not store all data that needs to be returned to the verification app 604. The verification service 606 may redirect the verification app 604 to a secondary service 612, passing a token that is trusted by the secondary service 612 so that the secondary service 612 provides requested information back to the verification app 604. For example, there may be a fishing license database that is separate from the verification service 606 so that the verification service 606 redirects the verification app 604 to a separate service that accesses the fishing license database to provide information to the verification app 604.

Referring to FIG. 6B, in some embodiments, the verification app 604 may not communicate directly with a verification service. Instead, the verification app 604 communicates through an intermediary service 614 that acts as an aggregator across multiple verification services 606a-606c. The intermediary service 614 may play an active role in determination of which of the verification services 606a-606c to use. An example of an intermediary service would be a service that aggregates information on many licensed contractors across multiple fields of professional expertise (similar to how the Angie's List service works). In some instances, the intermediary service 614 may provide the verification app 604 to the relying party.

Figure 7:
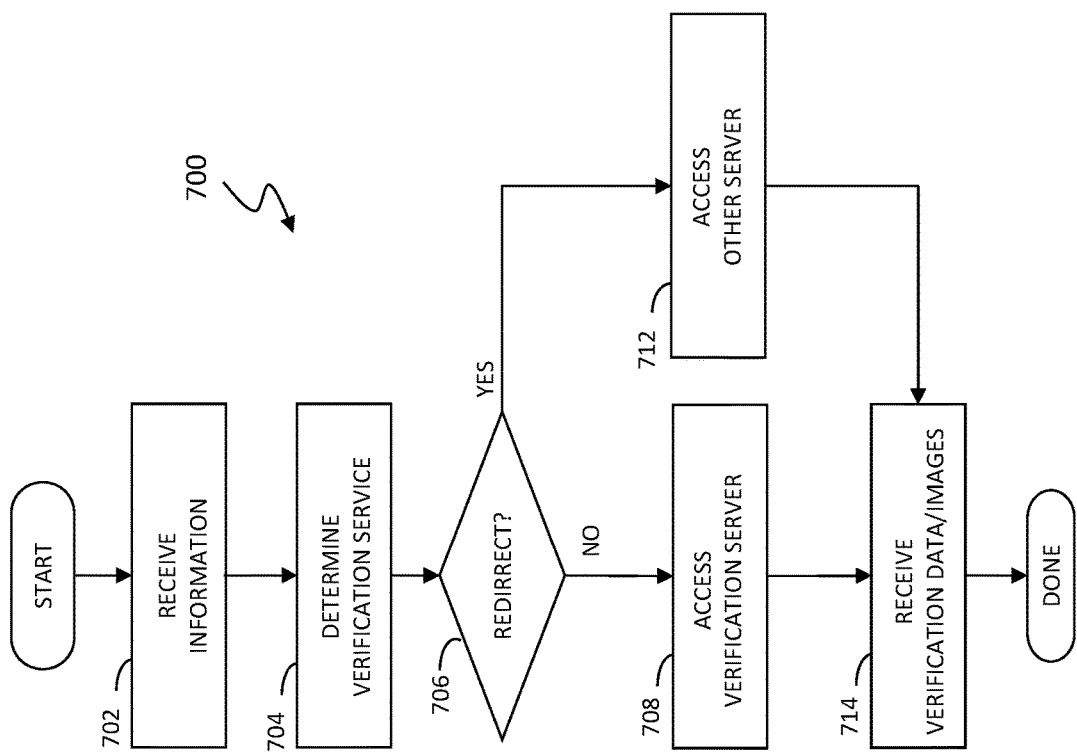
FIG. 7 is a flow diagram illustrating processing performed by a verifying device according to an embodiment of the system described herein.

Referring to FIG. 7, a flow diagram 700 illustrates steps performed by a device of a relying party in connection with validating information from a license holder. Processing begins at a first step 702 where the device of the relying party receives information from the license holder, either directly or through a cloud service (or similar) as discussed elsewhere herein. The information may include a cryptogram, license data, policy information, etc. Following the step 702 is a step 704 where a verification service is determined. As discussed elsewhere herein, the device of the relying party may contain one or more URLs for different verification services where a particular one of the URLs is chosen based on information provided by the license holder. Alternatively, the license holder may provide the URL, which may be digitally signed (or similar). A URL provided by the license holder may contain embedded security features such as a One Time Password that may be validated by the authentication server to guard against a replay of an earlier request.

Following the step 704 is a test step 706 where it is determined if the device of the relying party is being redirected to another server for verification data. As discussed elsewhere herein, in some cases a relying party may be directed to a different server for information. If not, then control passes from the test step 706 to a step 708 where the device of the relying party accesses the verification server. Otherwise, control passes from the test step 706 to a step 712 where the device of the relying party accesses an other server. Following the step 708 or the step 712 is a step 714 where the device of the relying party receives verification information, as discussed elsewhere herein. Following the step 714, processing is complete.

Referring to FIG. 8A, a diagram 800 shows an alternative embodiment having the network/cloud infrastructure 302 and the license holder device 304, but without the relying party device 306 (or without the relying party device 306 connected to the network/cloud infrastructure 302 and the license holder device 304). The network/cloud infrastructure 302 includes template data 802 that contains information used to adjust what information and/or visual characteristics of information displayed on the license holder device 304. A relying party determines validity of credentials on the license holder device 304 based on what is displayed thereon, as described in more detail elsewhere herein.

The template data 802 indicates specific information and/or conditions that determine what is to be displayed on the license holder device 304. Visual characteristics that may be varied include a location on the display of the license holder device 304 where a photo of the license holder is shown (e.g., top left, top right, center, etc.), the font used, the color of text used, the color scheme of the existing image (e.g., the background may change from light gray to dark gray), and/or a specific image that may not otherwise be part of the credentials of the license holder (e.g., a pine tree). Note that information that is selectively not displayed may be used as a means of visually verifying the license holder. For example, the template data 802 may indicate specific fields to be omitted from the display on the license holder device 304. As discussed elsewhere herein, information that may be displayed on the license holder device 304 includes name, address, date of birth, license number, etc. Each item to be displayed may be may individually set with a particular font, font color, size, position, etc., or all items may be set together.

Conditions may be used to determine the specific configuration of the display on the license holder device 304. For example, the template data 802 may indicate use of different font colors at different times of day. The template data 802 may be configured periodically (e.g., once per day) by an administrative entity and/or a relying party to a visual state that is known to the relying party, but otherwise not generally known. Thus, a relying party, such as a police officer, could expect on a certain day that the font is red from 9:00 am to 11:00 am, green from 11:00 am to 1:00 pm, etc. This information would not be known to a license holder, and thus it would be difficult for a license holder to generate fraudulent credentials.

In some cases, the verifying party may provide information to the license holder to confirm the identity of the verifying party. For example, a verifying party could verbally provide an alphanumeric value to the license holder (i.e., a "key"), which the license holder would then input into the license holder device 304 that transmits the value to the network/cloud infrastructure 302 for verification/identification. This is explained in more detail elsewhere herein. The conditions provided with the template data 802 could include different visual effects based on an identity of the relying party. For instance, different fields to be displayed and not displayed on the license holder device 304 could be specified for different police officers (relying parties). Also, as discussed elsewhere herein, the fields that are displayed may depend, at least in part, on a role of the relying party. In addition to the identity/role of the relying party, other conditions/parameters may be used including a time of day, a physical location of the license holder device 304, a work schedule of a relying party (possibly in combination with the time), the state of equipment associated with the relying party (e.g., for a police officer, an indication of whether body camera is enabled or disabled), the last time a relying party had connectivity, etc.

As discussed elsewhere herein, prior to inspection, the verifying party (and/or a different authorized entity) establishes (pre-defines) template rules and visual components for different conditions, such as a given location, a time period, etc. Visual components to be associated with a given combination of conditions may use an application on the license holder device 304 that manages presentation of the visual components that includes a visual presentation of credential information. When the application needs to provide the visual representation of the credential information, the application connects to the network/cloud infrastructure 302 and authenticates with a service. The application may provide the service with information about a physical location of the license holder device 304, a time of day, etc. Some data elements (such as time of day) may already be known at the license holder device 304 and not necessarily sent to the license holder device 304.

The application on the license holder device 304 may send a proof of identity to the network/cloud infrastructure 302. The proof of identity may be in a form of an HMAC message using a private key protected in some form on the license holder device 304. The network/cloud infrastructure 302 may fail to respond, or respond with inaccurate information, if the proof of identity is not correctly provided. Note that, if the license holder device 304 is a mobile phone, the proof of identity may include a phone number of the mobile phone. The network/cloud infrastructure 302 may dynamically generate a visual representation of credentials of the license holder (and possibly other visual components) that is sent to the license holder device 304 and displayed for view by the relying party. The relying party views the display on the license holder device 304 and confirms (or not) that the display matches expectations based on conditions (e.g., between 9:00 am and 11:00 am, the font is red). Alternatively, the network/cloud infrastructure 302 may select a record from the template data 802 that is appropriate for the application on the license holder device 304 to reconstruct appropriate visual components and sends the record back to the application. For example, the network/cloud infrastructure 302 could return to the application a template to cause the application to display a photo of the license holder in an upper left portion of the display and to use courier font in green. The relying party inspects the image on the license holder device 304 and, if the image is correct (i.e., if the image is as expected) the relying party can be confident that the credentials provided by the license holder are authentic. In some embodiments, it may be possible to present an image on the display (e.g., a tree) that changes into another (expected) image from when tapped (e.g., a tree changes into an image of a saw when tapped).

Figure 8B:
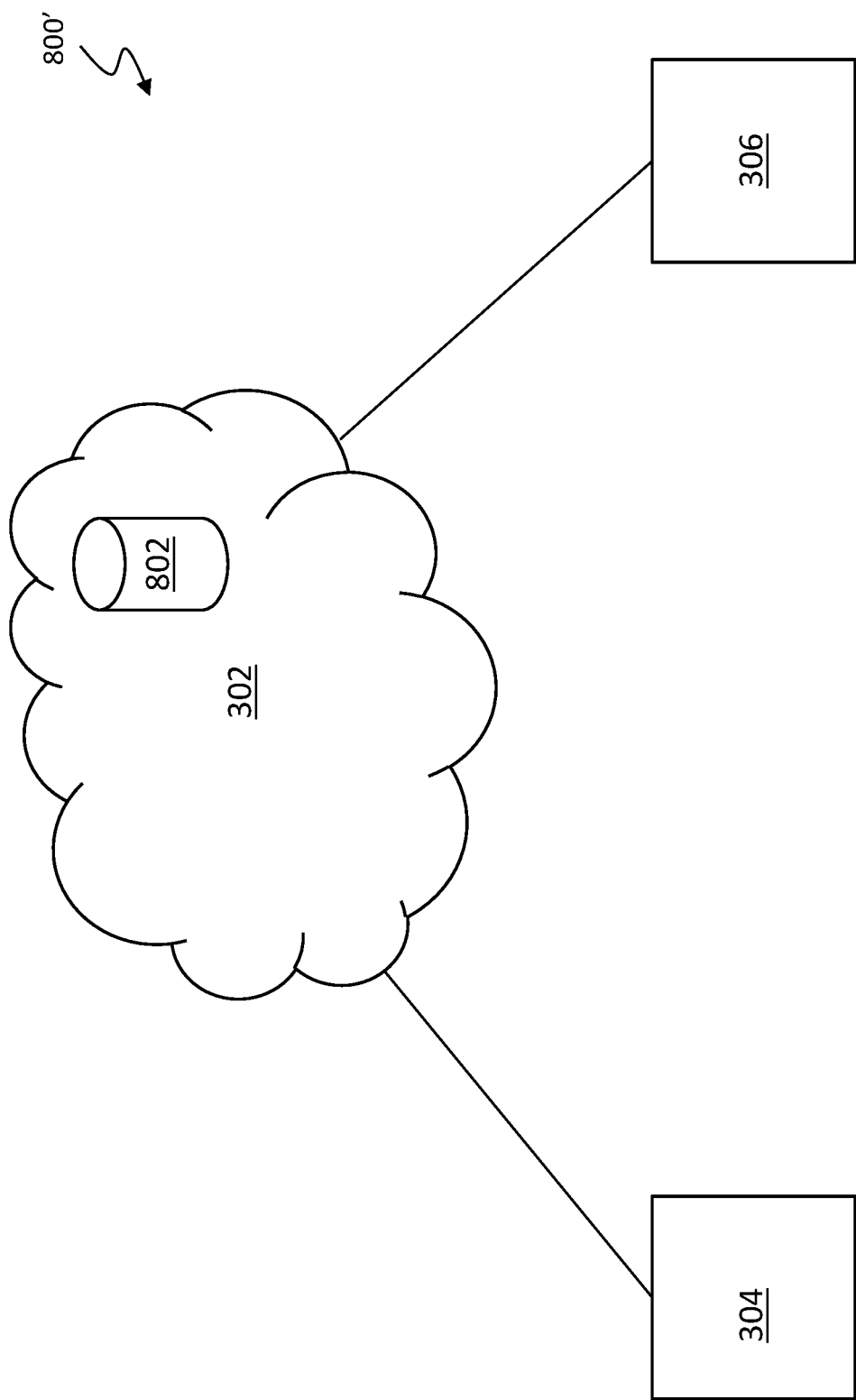

Referring to FIG. 8B, a diagram 800' shows an alternative embodiment having the network/cloud infrastructure 302, the license holder device 304, and the relying party device 306 where the relying party device 306 does not communicate directly with the license holder device 304. In the embodiment illustrated by the diagram 800', both the license holder device 304 and the relying party device 306 are connected to the network/cloud infrastructure 302. The network/cloud infrastructure 302 includes the template data 802, discussed elsewhere herein, that contains information used to adjust what information and/or visual characteristics of information displayed on the license holder device 304. As with the embodiment illustrated with the diagram 800, the relying party determines validity of credentials on the license holder device 304 based on what is displayed thereon. Note that the embodiment illustrated by the diagram 800' allows for all of the verification mechanisms discussed herein in connection with the embodiment illustrated by the diagram 800, but also allows for additional verification operations.

A table lookup may be used to identify an image on the license holder device 304 and a formula may be used to place the image in a particular location on the display. For example, L could be a location of the license holder device 304 normalized to a desired range or even indexed to a zone derived from coordinates such as GPS coordinates or other location information gathered by location services of an underlying phone OS platform. T could be a time of the day truncated to a desired change interval. K could be a secret key protected in some form on the license holder device 304. Then, an index I into an icon databank in the template data 802 could be I=HMAC(L+T, K) MOD (number of images in the database). The license holder would present the image on the license holder device 304 along with appropriate credentials for the license holder. The relying party would receive the same image from the network/cloud infrastructure 302 along with, for example, an image (photo) of the license holder, date of birth, etc., possibly using, in addition, correct (expected) fonts, correct (expected) color schemes, etc. In instances where multiple images are presented, the relying party device 306 could allow the relying party to tap the image and see dynamic images in a sequence that the relying party expects to see on the license holder device 304. In some cases, the relying party could receive updates 306 (using, for example, text or email) to the relying party device 306 of dynamic images to expect. The timing of the updates could be driven by changes in the data (for example by changing geographic locations, as time changes, etc.). Thus, in cases where the relying party loses access to database, the image displayed on the license holder device 306 may be driven by a last connectivity of the relying party.

Note that the system described herein may be implemented in situations where the relying party device 306 has connectivity to the network/cloud infrastructure 302 and connectivity to the license holder device 304, as illustrated in the diagram 300 of FIG. 3, described above. The relying party device 306 may receive images that are the same as images displayed on the license holder device 304 so that the relying party can examine the relying party device 306 to confirm a match with the display of the license holder device 304. Note that the relying party and/or the license holder may refresh using data from the template data 802 at any time.

As an example, the system described herein could enable a supermarket cashier to verify authenticity of a mobile driver's license presented as proof of age when purchasing alcohol. The cashier (and/or a supervisor, agent, etc. thereof) could pre-determine a template, color scheme and visual components at a location of the supermarket. Pre-determining the template could be done from multiple devices, or refreshed by a smart device of the cashier that assists with verification. A customer requested to provide proof of age would open the driver's license app on the device (e.g., smartphone) of the customer. The driver's license app would display driver's license information of the customer that has been formatted using the pre-determined template, color scheme and imagery unique to the location of the supermarket at the particular time.

Additionally, some aspect of the way in which the credential is presented might be a function of attributes of the credential. For example, an image presented for customers with last names beginning with A-K might be different than that presented for customers with last names beginning with L-Z. The license holder device presenting the image might also collect additional environmental measures detected by sensors on the device, such as levels of background noise or light, which would be sent to the network/cloud infrastructure (or similar) as determinants in generation of the image. In some cases, data, such as location and environmental measures, could be hashed or some other mechanism used to prevent the network/cloud infrastructure from being able to determine and record the actual physical location of the license holder device.

Note that an authentication check to retrieve template data could require input from the authenticating environment; for example, without a unique id of the relying party, the network/cloud infrastructure may refuse to return the template to the license holder device where the unique id might come directly from the relying party via wireless communication, or may be manually entered by the license holder based on verbal input from the relying party so that license holders may be prevented from learning the pattern of visual images to expect. An application used for verification may have a feature to dial, text, or otherwise contact an application on the license holder device. The license holder device may be a smartphone and a phone number of the smartphone may be released visually (displayed) by an application on the license holder device when retrieving the template, released to the network/cloud infrastructure, and then shared with the relying party device, released to the relying party device from an application on the license holder device, verbally shared by the license holder, and sent to the network/cloud infrastructure by the relying party device, etc.

In some embodiments, a text message may trigger a unique sound associated with the verification process. For instance, instead of a single tone to associate with the all text messages, a unique message sound may be sent with the template data or text communication. The unique sound may be defined as a part of the template, or dynamically sent by the relying party (possibly triggered from an image on an application on the relying party device). Thus, for example, a simple finger press of a photo of the license holder on the relying party device may automatically send a request to issue an audible alarm at the license holder device.

Figure 9B:
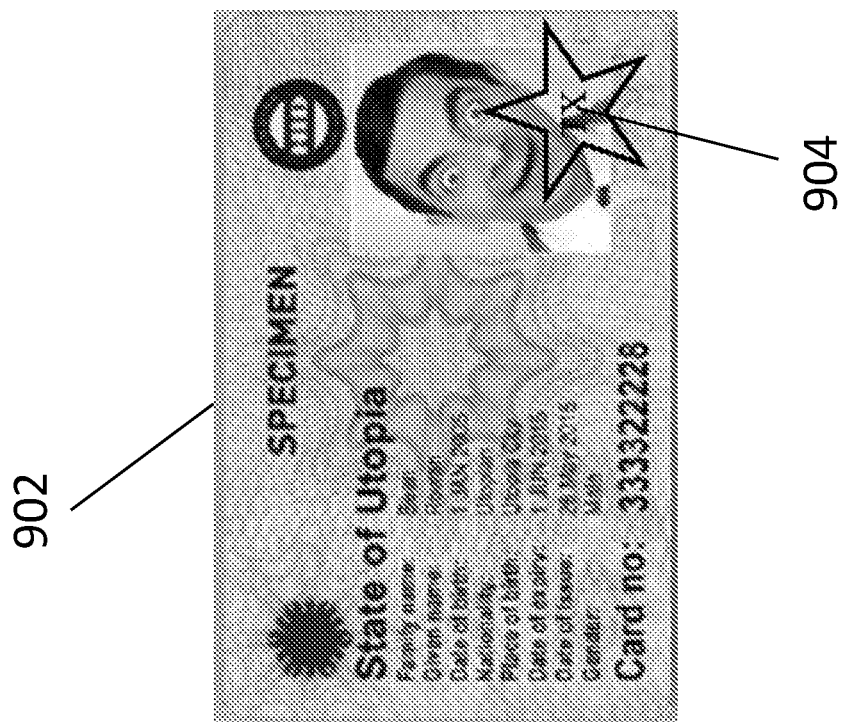
FIGS. 9A and 9B illustrate mobile credentials of a license holder along with an image superimposed thereon according to an embodiment of the system described herein.
Figure 9A:
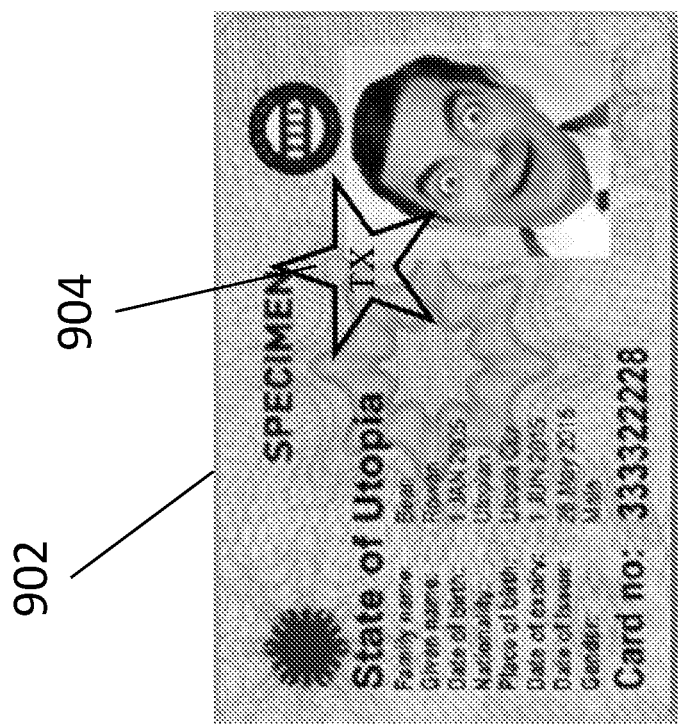

Referring to FIG. 9A, a display 902 shows mobile credentials of a license holder along with an image 904 superimposed thereon. As described in more detail elsewhere herein, a location of the image 904 and possibly the particular image 904 itself may depend upon conditions, such as a time of day, location, identity of the relying party, etc. Thus, a relying party, such as a police officer, may visually inspect the display 902 and determine validity of the credentials thereon based on the image 904. FIG. 9B shows the display 902 with the image 904 in a different location on the display 902, which corresponds to different conditions, such as a different time of day, location, etc. Note that it is also possible for FIG. 9B to represent a fraudulent version of the credentials so that, for example, the image 904 in FIG. 9B is not in a location that corresponds to an expected location based on conditions; in such a case a relying party viewing the display 902 in FIG. 9B would be able to visually determine that the corresponding credentials are fraudulent.

Figure 10:
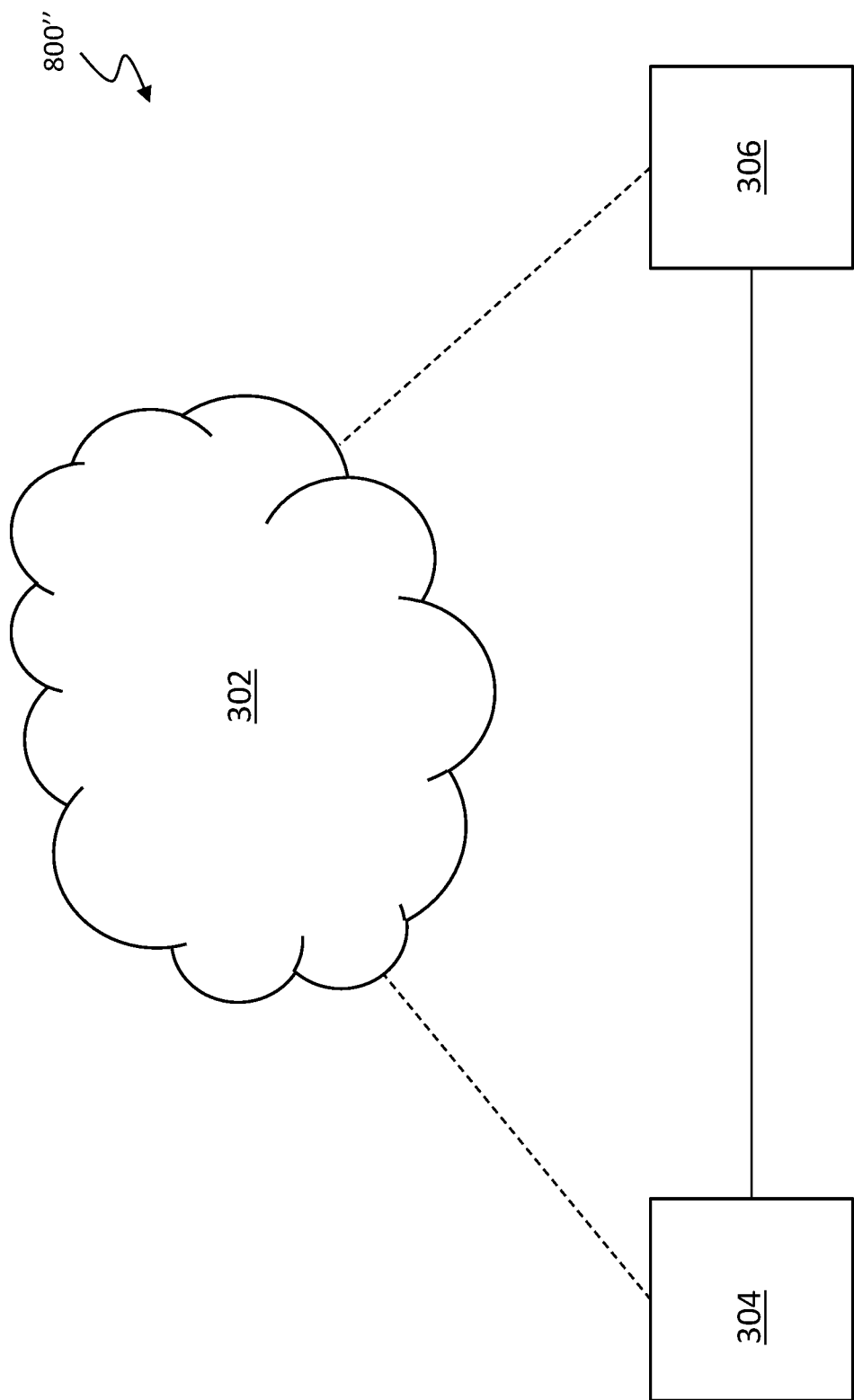
FIG. 10 is a schematic illustration showing a license holder device a communications/cloud infrastructure and a relying party device in intermittent communication according to an embodiment of the system described herein.

Referring to FIG. 10, a diagram 800" shows an alternative embodiment having the network/cloud infrastructure 302, the license holder device 304, and the relying party device 306 where the relying party device 306 communicates with the license holder device 304 and the license holder device 304 is connected to the network/cloud infrastructure 302. The relying party device 306 may have intermittent communication with the network/cloud infrastructure 302 or may have no communication at all therewith, as illustrated by a dotted line connecting the relying party device 306 with the network/cloud infrastructure 302. Similarly, the license holder device 304 may have intermittent communication with the network/cloud infrastructure 302 or may have no communication at all therewith, as illustrated by a dotted line connecting the license holder device 304 with the network/cloud infrastructure 302.

As discussed elsewhere herein, the relying party device 306 is used to verify/confirm credential information provided by the license holder device 304. In some cases, the information may be provided directly from the license holder device 304 to the relying party device 306 while in other instances at least some of may be provided to the relying party device 306 from the network/cloud infrastructure 302. In an embodiment herein, the license holder device 304 attempts to receive as much of the desired information as possible from the network/cloud infrastructure 302. There may be any number of reasons why this may be desirable, including faster and/or more efficient data transmission, improved security, etc. Of course, in instances where the relying party device 306 is not connected to the network/cloud infrastructure 302 (either by design or because of a poor connection), then all of the desired credential information may be provided directly from the license holder device 304 to the relying party device 306. In some instances, the relying party device 306 may communicate directly (or indirectly) with the with the license holder device 304 to indicate connectivity status between the relying party device 306 and the network/cloud infrastructure 302, where the connectivity status may include and/or take into account one or more of: historical, expected, or presumed error rate and/or throughput rate.

Authorization for the network/cloud infrastructure 302 to release information to the relying party device 306 may be provided by data transferred from the license holder device 304 to the network/cloud infrastructure 302, data transferred from the relying party device 306 to the network/cloud infrastructure 302, and/or data from the license holder device 304 that is relayed to the network/cloud infrastructure 302 by the relying party device 306. In the case of relaying the authorization data, the license holder device 304 may also provide url information (pointing to the network/cloud infrastructure 302) to the relying party device 306. For example, if the relying party device 306 is requesting information from the network/cloud infrastructure 302 for a particular license holder device 304, the license holder device 304 may first send authorization data to the relying party device 306 along with a url pointing to the network/cloud infrastructure 302. In other cases, the relying party device 306 may be authorized to receive information without any need for separate authorization data (e.g., the relying party device 306 of as police officer making a traffic stop). In some instances, authorization may be triggered by proximity of the devices 304, 306, with or without additional input from the license holder device 304.

Upon receipt of appropriate authorization, the network/cloud infrastructure 302 retrieves credential information corresponding to the license holder device 304 and then makes the credential information available for retrieval by the relying party device 306. In some cases, the network/cloud infrastructure 302 issues a token that may be used by the relying party device 306 for subsequent requests for credential information.

Figure 11:
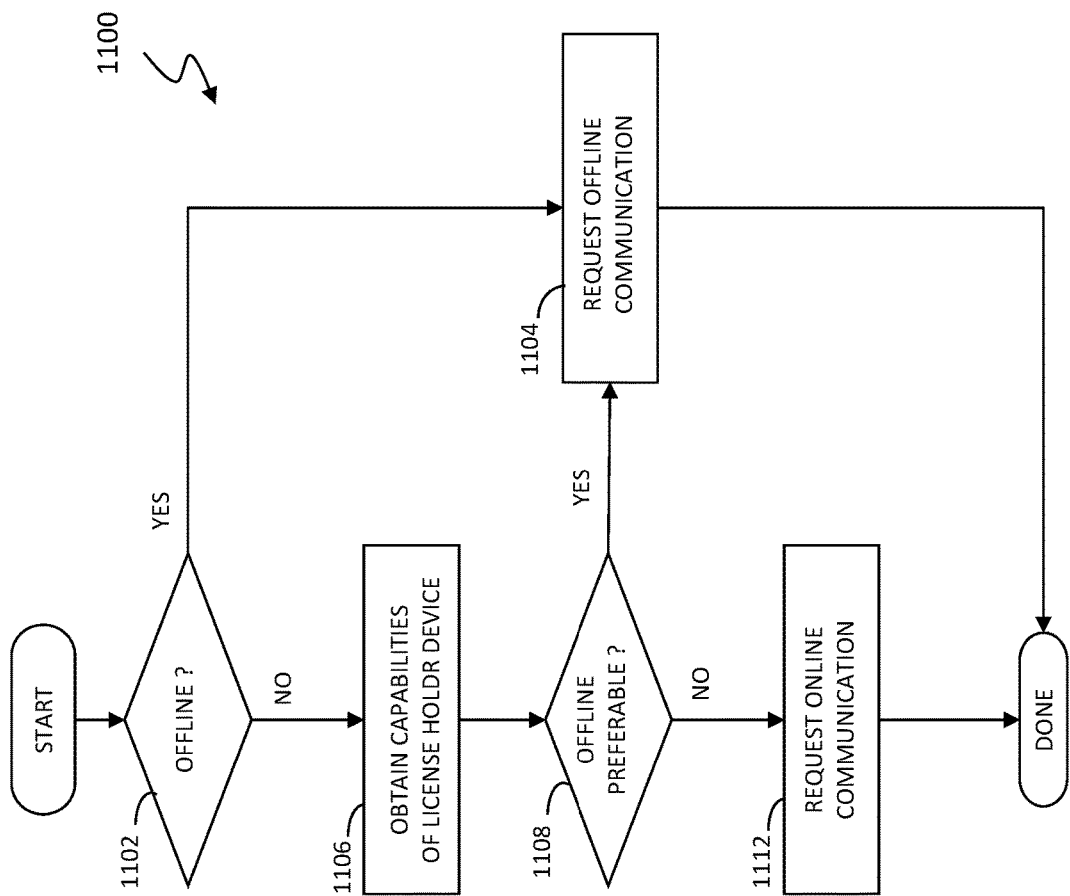
FIG. 11 is a flow diagram illustrating processing performed by a relying party device in connection with obtaining information about the license holder from a license holder device according to an embodiment of the system described herein.

Referring to FIG. 11, a flow diagram 1100 illustrates processing performed by the relying party device 306 in connection with obtaining information about the license holder from the license holder device 304. Processing begins at a first step 1102 where it is determined if the relying party device 306 is offline (i.e., not able to obtain information from the network/cloud infrastructure 302). If so, then control transfers from the test step 1102 to a step 1104 where the relying party device 306 communicates with the license holder device 304 to initiate communication therewith in offline mode, where all data is transferred directly between the relying party device 306 and the license holder device 304 without using the network/cloud infrastructure 302. In some cases, the relying party device 306 and the license holder device 304 may negotiate how much and which data to transfer. For example, if the bandwidth/data transmission speed is relatively low, then the license holder device 304 may transmit a relatively grainy photographic id of the license holder to the relying party device 306 while if the bandwidth/data transmission speed is relatively high, then the license holder device 304 may transmit a photographic id of the license holder having a better resolution (and using more data) to the relying party device 306. Following the step 1104, processing is complete.

If it is determined at the test step 1102 that the relying party device 306 is not restricted to offline operation only (i.e., the relying party device 306 can communicate with the network/cloud infrastructure 302 as well as the license holder device 304), then control transfers from the test step 1102 to a step 1106 where the relying party device 306 queries the license holder device 304 to obtain the capabilities thereof. Note that the relying party device 306 can choose whether to obtain specific information from either the license holder device 304 or the network/cloud infrastructure 302, where the choice may be based on one or more factors, such as relative speed/throughput of the different data sources, relative costs of data transmission, specific data available at each of the sites, etc. Note also that, in some instances, there may be a strong preference for online communication. For example, if the relying party is a bartender in an establishment having a local WiFi/LAN connection to the Internet, then the relying party device 306 may always elect to use online communication whenever possible.

Following the step 1106 is a test step 1108 where it is determined whether the relying party device 306 and the license holder device 304 will use online communication or offline communication. If it is determined at the test step 1108 that it is preferable to employ offline communication (i.e., direct communication between the license holder device 304 and the relying party device 306), then control transfers from the test step 1108 to the step 1104, discussed above, where offline communication is initiated. Otherwise, if online communication is preferable, then control transfers from the test step 1108 to a step 1112 where online communication is initiated. Online communication and offline communication are described in more detail elsewhere herein. Following either the step 1104 or the step 1112, processing is complete. Note that the processing illustrated by the flow diagram 1100 may be performed for an entire session between the license holder device 304 and the relying party device 306 (i.e., all data exchanged therebetween) or may be performed on an element-by-element basis so that, for example, some data elements are received by the relying party device 306 from the network/cloud infrastructure 302 while other data elements are received by the relying party device 306 directly from the license holder device 304.

In some instances, specific information may be required for a particular transaction/type of operation, and this may determine whether the relying party device 306 receives information from the license holder device 304 or the network/cloud infrastructure 302. For instance, a traffic stop may require that the police officer (that uses the license holder device 306) receive a photograph of the license holder, which, in some cases, may only be available on the license holder device 304 (or possibly only available at the network/cloud infrastructure). As another example, the license holder may only be allowed to drive certain types of vehicles and, in some cases, this information may only be reliably provided by the network/cloud infrastructure 302.

Figure 12:
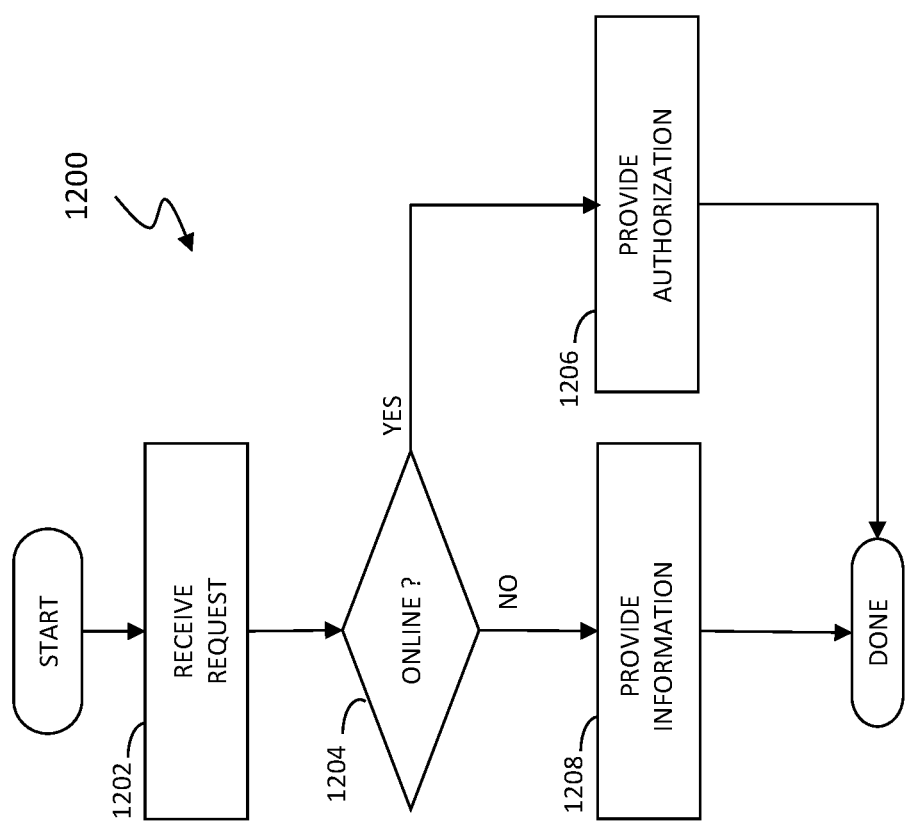
FIG. 12 is a flow diagram illustrating processing performed by a license holder device in connection with receiving a communication request from a relying party device according to an embodiment of the system described herein.

Referring to FIG. 12, a flow diagram 1200 illustrates processing performed by the license holder device 304 in connection with handling a request from the relying party device 306. Processing begins at a first step 1202 where the license holder device 304 receives the request. Following the step 1202 is a test step 1204 where it is determined if the relying party devices 1206 intends to receive desired information online (i.e., from the network/cloud infrastructure 302). As discussed elsewhere herein, the relying party device 306 may opt to not receive any information from the network/cloud infrastructure 302 either out of necessity (e.g., there no connection between the relying party device 306 and the network/cloud infrastructure 302) or by choice, possibly based on an appropriate metric that is used. If it is determined at the test step 1204 that the relying party device 306 is to receive validation information from the network/cloud infrastructure 302, then control transfers from the test step 1204 to a step 1206 where authorization data is provided by the license holder device 304 to either the relying party device 306, the network/cloud infrastructure 302, or both, as discussed elsewhere herein. Providing authorization at the step 1206 is discussed in more detail elsewhere herein. Following the step 1206, processing is complete.

If it is determined at the test step 1204 that the relying party device 306 is to receive validation information directly from the license holder device 304 (i.e., is "offline"), then control transfers from the test step 1204 to a step 1208 where requested information is provided directly by the license holder device 304 to the relying party device 306. The information may be provided at the step 1208 using any appropriate mechanism, such as a conventional key exchange followed by exchanging encrypted data. As discussed elsewhere herein, the request from the relying party device 306 and/or the data from the license holder device 304 may be digitally signed (or similar) for verification and/or non-repudiation. Also, as discussed elsewhere herein, at least some of the validation information may be displayed on the relying party device 306. Note that displaying data may occur irrespective of the source of the information (i.e., the network/cloud infrastructure 302 or the license holder device 304). Following the step 1208, processing is complete. Note, by the way, that specific data that is transmitted (and/or the form of the data) could depend, at least in part, on whether the relying party device 306 is receiving the data in online mode or offline mode.

In an embodiment herein, the license holder device 304 may store verification keys that are used to generate a credential verification cryptogram (CVC) that can be verified by the network/cloud infrastructure 302 prior to releasing credential information to the relying party device 306. The CVC could be a one-time password (OTP) that uses an HMAC OTP algorithm (HOTP). In other embodiments, the license holder device 304 stores an asymmetric private key while the network/cloud infrastructure 302 has a corresponding public key, where the CVC is a nonce (or similar) signed by the license holder device 304 using the private key. The nonce (or similar) may be generated by the license holder device 304, the network/cloud infrastructure 302, and/or the relying party device 306.

Figure 13:
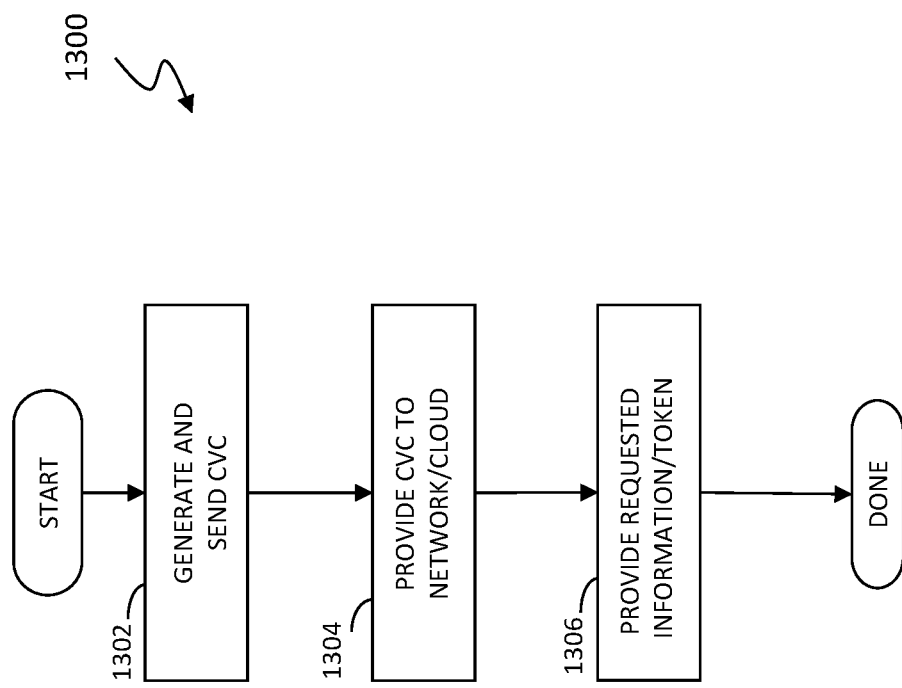
FIG. 13 is a flow diagram illustrating processing performed in connection with a relying party device obtaining online information according to an embodiment of the system described herein.

Referring to FIG. 13, a flow diagram 1300 illustrates in more detail the relying party device 306 obtaining data from an online source, such as the network/cloud infrastructure 302. Processing begins at a first step 1302 where the license holder device 304 generates a CVC and provides the CVC to the relying party device 306. As discussed elsewhere herein, in some embodiments, the CVC may include a URL of a particular website in the network/cloud infrastructure 302. Following the step 1302 is a step 1304 where the relying party device 306 provides to the network/cloud infrastructure 302 the CVC as well as possibly other identification/verification information (e.g., a digitally signed identifier for one or both of the license holder device 304 and the relying party device 306). Following the step 1304 is a step 1306 where the network/cloud infrastructure 302 provides the requested information to the relying party device 306. In some embodiments, the network/cloud infrastructure 302 may provide a token to the relying party device 306 where the token may be used to subsequently retrieve data from the network/cloud infrastructure 302 or possibly even a different source. Following the step 1306, processing is complete.

The system described herein may be adapted to be used with or in place of a physical passport or travel documents. In an embodiment herein, a traveler may apply for a physical passport and also enrol in a corresponding electronic passport service, possibly for a fee. The system creates a data structure for use on a cellular communications capable mobile device of the traveler (e.g., a smartphone, tablet, etc.) linking physical passport information, such as passport number, country of issue, (surname, given name, date of birth, etc.), with a virtual travel credential which in turn is bound electronically to the cellular number of the device of the traveler. The virtual travel credential may be an electronic equivalent of a passport or travel document, so that, for example, the virtual travel credential includes photographic and textual data that is similar to photographic and textual data that is either visible on a physical passport data page or other travel document, and/or is contained in electronic data held on a contactless chip of the physical passport. The virtual travel credential may facilitate border crossing and other identity-establishment scenarios such as police checks.

The virtual travel credential may be used to establish identity while in a foreign country, thus allowing the traveler to leave his or her physical passport and/or other travel documents in a safe location such as a hotel safe. A preloaded app in the mobile device of the traveler may either facilitate the delivery of a valid virtual travel credential to the mobile device of the traveler, or enable the traveler to more easily obtain a replacement, emergency or temporary physical passport and/or other travel document(s), possibly from an embassy.

In an embodiment, the mobile device of the traveler is loaded with an application that links a physical passport or travel document(s) of the traveler with a virtual travel credential of the traveler. When the application associates with a particular mobile network on arrival in a new country/territory, the application on the device (or possibly a mobile network operator, on behalf of the traveler) may notify a local embassy or consulate that the traveler is entering a particular country/territory, and may share the credentials of the traveler with the embassy or consulate. In this case, the application/mobile device notices that there has been a geolocation change that includes a new country/territory and sends the locale change to a local embassy contact point, either directly or through a network. The personal information of the traveler may be encrypted so that the mobile network operator knows only that the traveler has registered with the network, but the mobile network operator may not have access to encrypted personal information of the traveler. Once the traveler moves to a different country/territory, the new location is reported to the local embassy contact in the new country/territory and an exit is reported to the country/territory from which the traveler has departed.

Linking the physical passport or travel document with the virtual travel credential facilitates getting a replacement physical passport or travel document that may have been lost or stolen while traveling. If the traveler reports a lost physical passport or travel document, the corresponding embassy may more readily/easily generate a temporary, emergency or replacement physical passport or travel document (and/or virtual travel credential) because the embassy has already received reliable electronic information from the application about the traveler and the location of the traveler.

The traveler may sign up for the electronic passport service on a mobile device, such as a smartphone. The traveler may use the virtual travel document as a general means of identification and/or as a means for entering another country/territory or returning home from another country/territory. In an embodiment, the traveler receives a smartphone application to provide virtual travel document functionality and configures the settings of the application to notify an embassy on arrival in foreign country/territory. The traveler may configure the notification to be automatic, manual, or disabled. Disabling the notification may allow the traveler to manage privacy settings in a different way.

When the traveler travels to another country/territory and switches on a mobile device (e.g., mobile phone) in the new country/territory, the mobile device connects to a roaming service. In the application that provides passport/virtual travel document functionality is set to be operated in automatic mode, a notification is sent to the local embassy from either the application or from a passport office in a home country of the traveler. The notification indicates to the local embassy that the traveler has arrived in the local country/territory. If the application is set to be operated in manual mode, the traveler may be prompted to send the notification and/or to cause the notification to be sent from a passport office in a home country of the traveler. Alternatively, when the traveler is checking in to a flight at a boarding gate, and has presented a mobile device containing a boarding pass, the gate software may receive from the mobile device identity information of the traveler. The gate software may then forward the destination location and the identity information to an embassy of record and/or cause the notification to be sent from a passport office in a home country of the traveler.

In some embodiments, if the traveler loses a physical passport and/or other travel document(s), the traveler may use the virtual travel credential to prove arrival in another country and thus may have faster access to services to provide a temporary or emergency physical passport and/or travel document(s) which could be delivered either in virtual or physical form to the traveler. An application that provides virtual travel document functionality on a mobile device of the traveler could contain a notification button which allows the traveler to inform a passport provider that the traveler has lost a physical passport and possibly also to indicate a location of the loss. The notification of loss could generate a response to the mobile device of the traveler that provides instructions for reporting that the physical passport is missing and/or for obtaining a temporary physical passport (or similar) from a local embassy.

The notification of loss may also trigger release of a temporary or emergency virtual travel credential which would allow the traveler to return to a country/territory of origin. The temporary or emergency virtual travel credential may restrict the traveler from travelling to anywhere other than the country/territory of origin. In some cases, the traveler may have signed up for a mobile phone passport service, but only obtains a virtual travel credential upon notification of loss and proof of identity being established. The temporary virtual travel credential may be sent to immigration authorities of a country/territory that the traveler is exiting to allow the traveler through passport control. Thus, instead of sending a temporary virtual travel credential to the mobile device (smartphone) of the traveler only, the virtual travel credential could also be sent from one government to another government (i.e., from a home country/territory of the traveler to a country/territory where the traveler is located). In such a case, the virtual travel credential may be called up by border control officials based on identity information from the traveler, such as a fingerprint scan, facial recognition, passport number, name, country of origin, etc. The temporary virtual travel credential may be revoked as soon as the traveler passes through immigration in a home country/territory, depending on policies of an issuing country.

Note that the system described herein may be used on any device capable of storing data and communicating with remote services, such as a cell phone (smartphone), an iPad, a laptop, a desktop device, a server device, etc. However, in some embodiments, the system may work best on cellular-equipped devices for reasons of needing to bind a cellular ID to a particular device and needing to communicate with a cellular network to establish location and entry or exit to or from a specific country/territory.

Figure 14:
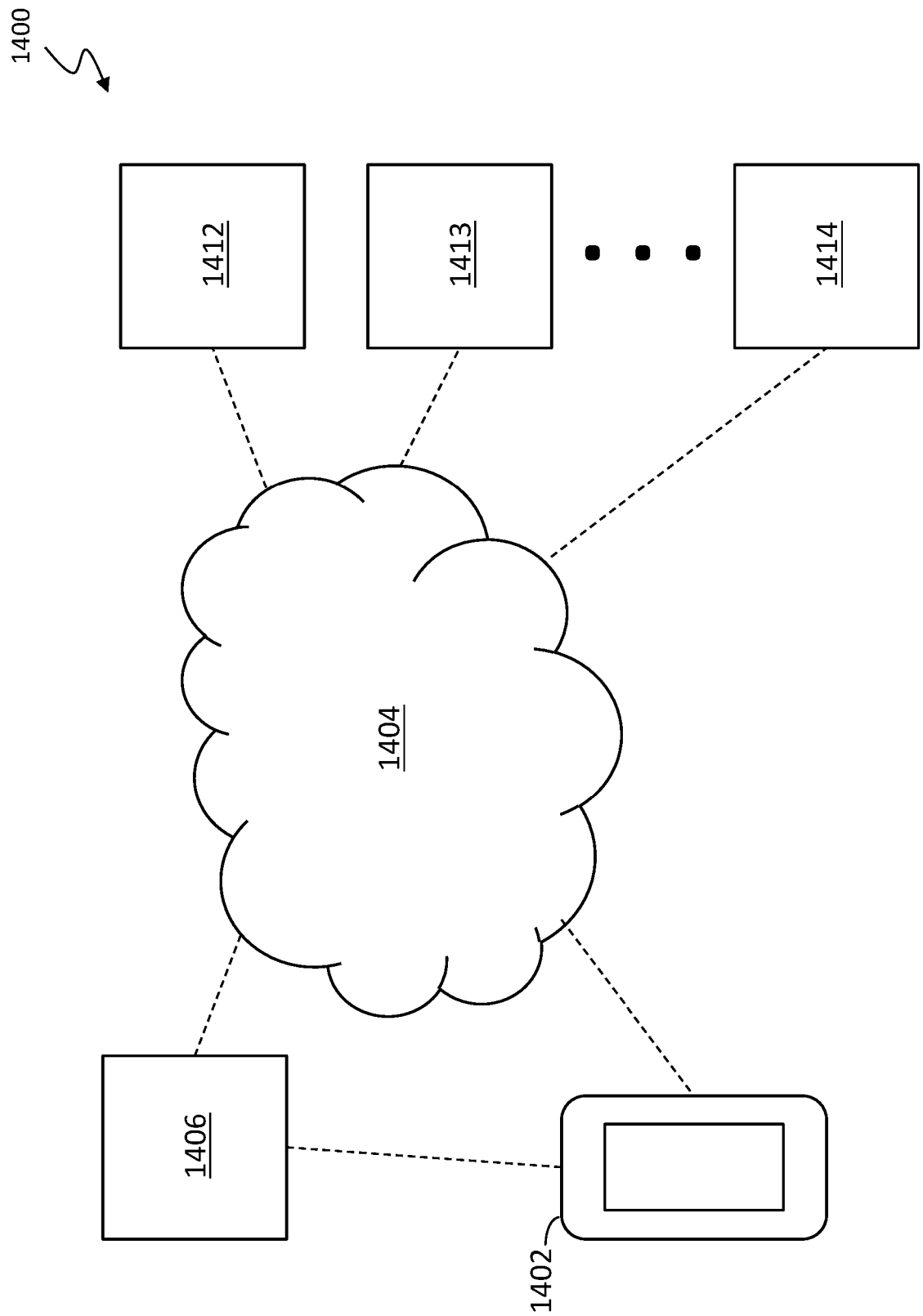
FIG. 14 is a schematic illustration showing a mobile device, a virtual travel credential server, a plurality of embassies, and a network according to an embodiment of the system described herein.

Referring to FIG. 14, a diagram shows virtual travel credential system 1400 that includes a mobile device 1402 containing data for a virtual travel credential stored on the mobile device 1402. In an embodiment herein, the mobile device 1402 may be a smartphone, although other types of mobile devices, such as an iPad (tablet), are also possible. Virtual credential functionality may be provided by an application (app) operating on the mobile device 1402 in combination with specific hardware provided on the mobile device 1402, such as GPS location hardware. The mobile device 1402 with the virtual travel credential may be similar to the license holder device described elsewhere herein and any similar functionality/operation will not necessarily be repeated in connection with the description of the mobile device 1402.

The mobile device 1402 communicates with a network 1404, such as a cellular network, to send and receive data. In an embodiment herein, the telephone number of the mobile device 1402 binds the virtual travel credential provided therein to a particular traveler and/or particular physical passport and/or particular travel document(s) for the traveler. Of course, other characteristics of the mobile device 1402, such as the IMEI of the mobile device 1402, may be used for the binding. In some cases, the traveler pre-registers with a service that causes the mobile device 1402 to be bound to specific travel information/documents. For example, the traveler may download an app to the mobile device 1402 and then use the app and the mobile device 1402 to input information from a physical passport, including possibly using a camera of the mobile device 1402 to scan/input visual information, such as an image (photo) of the traveler.

Information used in connection with the virtual travel credential, including binding information, may be provided in a virtual travel credential server 1406, that may be maintained by a government agency, such as a home embassy of the traveler, or, alternatively, by a private entity that may contract with the government agency. The virtual travel credential server 1406 may be coupled with the network 1404 and may use the network 1404 for transferring data. Information may be exchanged between the mobile device 1402 and the virtual travel credential server 1406 either through the network 1404 and possibly also directly between the mobile device 1402 and the virtual travel credential server 1406. In some embodiments, the virtual travel credential of the traveler is uploaded from the mobile device 1402 to the virtual travel credential server 1406. Operation of the virtual travel credential server 1406 is discussed in more detail elsewhere herein.

A plurality of embassies 1412-1414 communicate with the virtual travel credential server 1406 and possibly with the mobile device 1402 via the network 1404. Note that one or more of the embassies 1412-1414 may also communicate with the virtual travel credential server 1406 and/or the mobile device 1402 using some other communication mechanism (not shown in FIG. 14), such as the World Wide Web, one or more dedicated communication channels, etc. As described in more detail elsewhere herein, one or more of the embassies 1412-1414 and/or the virtual travel credential server 1406 may receive notification as the traveler enters and leaves countries/territories and, in some cases, may assist when a traveler needs a replacement passport and/or other travel document(s).

Referring to FIG. 15, a flow diagram 1500 illustrates steps performed in connection with a traveler having a virtual travel credential that is travelling between countries/territories. Processing begins at a first test step 1502 where it is determined if the traveler is transitioning from a first country/territory to a second country/territory. The determination at the step 1502 may be made using a number of possible different mechanisms. In some cases, a mobile device of the traveler automatically connects to a particular cellular network in the new country/territory that is different from a previous country/territory where the traveler had been located. For example, as the traveler travels from France to Germany, the mobile device of the traveler eventually switches from a cellular network in France to a cellular network in Germany, thus automatically indicating that the traveler is entering a new country/territory. Of course, other mechanisms may be used, such as the traveler manually actuating an application on the mobile device to manually indicate egress to a new country/territory. The system may verify a location of the traveler based on GPS information from the mobile device and/or based on a cellular network to which the mobile device is connected. For example, if the traveler actuates the mobile device application to indicate that the traveler is in Germany, the system may verify the location of the traveler using GPS functionality of the mobile device and/or by confirming that the mobile device is communicating with a German cellular network.

If it is determined at the test step 1502 that the traveler has not entered a new country/territory, then control transfers back to the step 1502 to continue polling. Otherwise, if the traveler has entered a new country/territory, then control transfers from the test step 1502 to a step 1504 where a departing embassy (i.e., an embassy of a country/territory from which the traveler is leaving) and possibly a home embassy of the traveler (e.g., the virtual travel credential server 1406) are notified. In some embodiments, notification may be provided by a cellular network service of a mobile device of the traveler. For example, the traveler may have a smartphone with a unique identifier, such as cell phone number, IMEI number, etc. The cellular network service may receive an indication that the mobile device is part of a system in which notification is provided as the traveler changes locations/networks. In other embodiments, the mobile device provides specific notification to the cellular service that passes the information on to one of the embassies 1412-1414 and/or the virtual travel credential server 1406 (which may or may not correspond to a home embassy of the user). In still other embodiments, the mobile device may send information directly to an embassy via a network (such as the network 1404, discussed above) or possibly via some other communication mechanism. Note that it is also possible to use airline boarding information so that, for example, presenting a mobile device at a boarding gate of a flight leaving a country/territory causes the notification to be provided. In all cases, the notification may include at least some encrypted information to protect privacy of the traveler. For example, the information may include a clear text token/identifier that corresponds to the traveler along with encrypted information that specifically identifies the traveler.

Following the step 1504 is a step 1506 where an arriving embassy (i.e., an embassy of a country/territory to which the traveler is arriving) and possibly a home embassy of the traveler are notified. The mechanisms and modes of operation for the notification are similar to those described above for when the traveler provides notification in connection with leaving a country/territory. Thus, for example, the notification may be automatic or manual, may be provided by or relayed by a cellular service company or directly, may be partially encrypted, etc. Following the step 1506, control transfers back to the step 1502, described above, to continue polling.

Referring to FIG. 16, a flow diagram 1600 illustrates steps performed in connection with obtaining a temporary/replacement physical passport or travel document. Processing begins at a first step 1602 where a traveler notifies the virtual travel credential server 1406 (described above) about the loss by, for example, actuating the mobile device of the traveler so that the mobile device sends a message to the virtual travel credential server 1406. As discussed elsewhere herein, the virtual travel credential server 1406 may be associated with a home embassy (or similar government entity) of the traveler. For example, for a U.S. citizen, the virtual travel credential server 1406 may be managed by or at least communicate with the U.S. State Department. In other embodiments, the traveler may instead notify a particular one of the embassies 1412-1414 (described above) of the loss using, for example, the mobile phone of the traveler.

Following the step 1602 is a step 1604 where one or more of the embassies 1412-1414 is contacted to confirm a location of the traveler. As discussed elsewhere herein, as the traveler travels from one country/territory to another, different ones of the embassies 1412-1414 are notified of the location of the traveler using the mobile device of the traveler. At the step 1604, the virtual travel credential server 1406 may contact a relevant one of the embassies 1412-1414 to confirm location of the traveler and the relevant one of the embassies 1412-1414 may determine if a message was received indicating the location of the traveler. For example, if the traveler purports to be in Germany, then at the step 1604 the virtual travel credential server 1406 may contact the embassy in Germany to confirm that the embassy received a signal/message that the traveler entered Germany. Following the step 1604 is a test step 1606 where it is determined if the result of the test confirms the location of the traveler. If not, then something is wrong because there is a disagreement between where the traveler purports to be and where the system believes that the traveler is located and thus processing is complete. Otherwise, if it is determined at the test step 1606 that the system detects that the traveler is in a location corresponding to a location where the traveler purports to be, then control transfers from the step 1606 to a step 1608 where the traveler is issued a replacement/temporary credentials (e.g., passport or travel documents), as described elsewhere herein. Note that, if the virtual travel credential includes an image of the traveler, then an embassy employee handling the replacement may confirm that the traveler looks like the image that is part of the credential. Following the step 1608, processing is complete.

The system described herein may have many possible uses. For example, a hotel receptionist may use a mobile phone (receptionist mobile phone) to validate authenticity of a driver's license presented on a mobile phone of a guest (guest mobile phone) checking in to the hotel. The guest begins by opening a driver's license app on the guest mobile phone. The driver's license app displays a virtual representation of a driver's license, including a license number, a name of the guest, a date of birth of the guest, an address of the guest, an expiry date, and a photo of the license holder. The guest may then touch the image of the driver's license displayed on the guest mobile phone, which responds by generating and displaying a 2-D barcode. The 2-D barcode has encoded therein information indicating an issuing state of the driver's license, a license number, and an authentication cryptogram. The receptionist opens a driver's license verification app on the receptionist mobile phone and uses the verification app to take a photo of the 2-D barcode displayed on the guest mobile phone. The verification app decodes the 2-D barcode and connects to a trusted verification service corresponding to a particular state that issued the driver's licenses, passing the license number and the authentication cryptogram. The trusted verification service validates that the submitted authentication cryptogram is valid for the license number passed thereto and responds with a pre-constructed image of the driver's license of the guest. The pre-constructed image, which may include a photo, name, date of birth, etc., is displayed on the receptionist mobile phone. The receptionist is able to do a visual comparison of the image of the license displayed on the receptionist phone with an image of the license displayed on the guest mobile phone, thereby enabling the receptionist to confirm authenticity of the mobile driver's license of the guest.

An alternative example relates to enabling a police officer to use a mobile phone (verifying device) to validate authenticity of a driver's license (license holder device). Initially, the driver opens a license app on the license holder device, which may be a smartphone or a tablet. The license app displays an image corresponding to a driver's license, including a license number, name, date of birth, address, expiry date and a photo of the driver (license holder). The police officer opens a driver's license verification app on the verifying device, which also may be a smartphone or tablet, but could also be a laptop or other type of computing device. The driver may then touch the image of the driver's license displayed on the license holder device, which responds by generating an authentication cryptogram. The authentication cryptogram is transmitted to the verifying device (using, for example, Bluetooth Smart technology or some other type of appropriate communication system) along with information indicating an issuing state and a license number. The verification app then connects to a verification service for the issuing state, passing the license number and the authentication cryptogram. The verification service validates that the submitted authentication cryptogram is valid for the license number and responds to the verifying device with confirmation of authenticity for the driver's license, plus (possibly) additional relevant information regarding the driver. The information received by the verifying device is displayed on the verifying device for the police officer to view.

Yet another example illustrates a consumer using a mobile phone (or similar device) to validate authenticity of a license presented by a contractor, taxi driver, real estate agent or other licensed professional and to verify insurance details of the licensed professional. Initially, the licensee opens a professional license app on a license holder device, which may be a mobile phone, a tablet, or similar. The license app displays an image corresponding to a license to practice, including information such as a license number, name, professional services that the license holder is licensed to practice, expiry date and a photo of the licensee. The licensee then touches the image on the license holder device, which responds by generating and displaying a 2-D barcode, into which is encoded an issuer of the license, the license number, a type of license (e.g., electrical, plumping, etc.), a signed URL that identifies a trusted verification service and an authentication cryptogram. The consumer opens a license verification app on a verifying device (the mobile phone, or similar, of the consumer) and uses the license verification app to take a photo of the 2-D barcode displayed on the license holder device. The verification app decodes the 2-D bar code, confirms the signature of the URL, and connects to the trusted verification service, passing the license number and the authentication cryptogram. The trusted verification service validates that the submitted authentication cryptogram is valid for the license number and responds with a confirmation of validity and details on an insurance policy of the licensee. The verification app may subsequently provide supplementary services such as verifying that the insurance of the licensee is valid to cover a proposed work schedule.

The system described herein may be used for automatically populating of a form, automatically checking out, validating a physical credential, and/or to board a plane. In the case of boarding a plane, a smartphone of a user may provide both identification and a boarding pass. In some cases, a tap of the smartphone may be used to get past TSA authentication while going from an unsecured portion of the airport to a secured portion of the airport dedicated to flying passengers. It may also be possible to include TSA pre-approval with the same tap where TSA pre-approval might be a 'status' shown on the display of the smartphone. In addition, the system described herein may be used to validate a biometric at a gate to provide a Biometric Exit functionality so that a user transfers their identity to an airline by providing a biometric while boarding the plane so that the airline validates that the user actually boards the plane and does not leave the airport. It is possible to store on a device of a user a log indicating that a sequence of checks within an airport were performed. The smartphone allows generation of a key pair that is protected with a biometric. In an embodiment, the following sequence occurs:

a user walks up to the gate
an application on the smartphone is in listen/input mode
the user presses a biometric touch/id on the smartphone
the smartphone releases a (temporary) key/pair that was optionally generated within a protected component on the smartphone. Thus, the key/pair is already known to a validating authority and it is not necessary to distribute biometric data of the user to the validating authority.

The biometric information may be facial, fingerprint, iris scans, etc. Self-reporting via mobile technology broadening allows the user to use the mobile processing power of the smartphone, relieving the load on the government systems.

The system described herein may be used in an amusement park, such as Disneyworld. A "Fast Pass" system allows a user to get to the front of the line of a ride using a wrist band that the is provided by the park. The wrist bands need to be authorized. The system described herein allows authorization to be delivered to wrist band using smartphones of the users, thus allowing users to purchase Fast Pass tickets on the Web without having to wait in line. SEOS could be the authentication technology that is used.

As another example, Austin city limits allows users to provide cashless payments via a smartphone, but it is still necessary to present a separate physical ID card. The system described herein allows a smartphone to be used to provide cashless payment authorization and proof of age to buy an adult beverage at the same time. A sales associate could receive a 'code' instead of an identity that shows both that the user paid and was over 21. Thus the user is registered with certain permissions (>21 being just one example). The system described herein could be extended to cruise ship amenity access.

It is also possible to provide a remote identity application with a one time password, digital certificates for documents, an ability to fill out forms remotely, and/or self-identify a user via a smartphone. It is also possible to use the system described herein in connection with online mortgage applications. It is also possible to link a mobile id of a user with a trusted tag proof of presence. Real estate lock boxes could be replaced with a "key" provided by the system described herein. It is also possible to use the system described herein in connection with an AutoID in a healthcare environment. A user would identify themselves ahead of time (e.g., when making an appointment) by sharing identity information provided by the system described herein. Thus, when the user arrives for a medical appointment, the medical personnel know of the arrival arrived because the smartphone broadcasts an appropriate message that the user has arrived. Thus, by carrying the smartphone, the user does not need to check in with a receptionist. This system described herein automatically identifies the user, and allows location of appropriate medical records.

The system described herein may be used in connection with an automobile recording an identity of a person driving the automobile. If there is an accident, insurance information tied to the identity may be automatically saved (for example when the air bags are deployed) to a log so that the automobile rental company (or automobile sharing company) can determine who was driving the automobile at the moment of the accident. The insurance that is tied to the identity may be digitally signed by the insurance company, and the insurance/identity combination may be digitally signed to confirm a relationship between the insurance company and the identity.

Note that any sort of license application could be the same application (i.e., reused). One license could be a 'breeder' for other licenses (fishing, dog, etc.). The breeder license has all of the personal data of the license holder (such as address) and thus the breeder license can be used to pre-populate other licenses. It is possible to provide an option for the user to need to explicitly authorize the release of information in the breeder license to the other license applications.

The system described herein may be used to prevent a gun from firing unless is it properly linked to a mobile id. Similarly, it is possible to integrate gaming equipment to prevent participation by underage users. Different version of credentials may be provided to different classes of users, for example, individuals under a certain age (e.g., 18). Individuals with a Learner's Permit driver's license learning to drive may only drive if another licensed driver is present. The smartphone may capture the fact that a person is next to the driver and capture the time frame that the person is present. The information may be captured for reporting to the state. If an automobile is tagged, it may be possible to track the car being driven. The system described herein may be used to prevent texting while driving. If a user is under 18, the system may turn off texting capabilities. In some instances, allowing texting to be disabled be voluntary, but may reduce insurance costs. The system described herein may be used to log the type of road (highway/backroads, rural-vs-city road, etc.) detected via google maps and based on sensed mobile location. The result may be tied to license driving history and/or may be used to alter insurance rates.

The system described herein may be used for USCIS— integrating mobile into greencard. Self-reporting may be helpful, along with a biometric. The Biometric Exit on a plane mechanism, described above, may be applied to someone passing through a country border. In some embodiments, biometrics are all that is needed to get on to plane. The system locates a ticket of a user. As the user boards a flight, the system may automatically notify, for example, a rental car service that the user boarded the flight, and that the car should be reserved. In some cases, the system may limit information transmitted during authentication. A user may somehow validate information on a mobile id license. A user may release information into a form. The system may automatically populate information into the forms. A user may supplement information stored with a mobile id and prepopulate forms with the information. For example, an employer could supplemental information that is not required (stored) in a standard driver's license. Having the information from the driver's license could help pre-populate many forms. The information could be protected by driver's license security features. A mechanism could be provided to validate the data.

The system described herein may be used in connection with renting a car. When a user rents a car or test drives a new car, the user may tap their smartphone, which then automatically provides a copy of the license and a copy of the insurance that is electronically signed by the insurance company to the car dealer or rental company. The rental company may use a public key of the insurance company to decode the insurance and thus validate the insurance. The validation may confirm that the insurance was current online at the time of the check. In some cases, when the insurance is renewed, a user automatically receives updated insurance information downloaded to the license holder device and/or a network/cloud infrastructure. The system described herein may provide a tunnel to all other mobile licenses.

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only.

What is claimed is:

1. A method of maintaining information for a traveler, comprising:
    creating a virtual travel credential containing information from at least one of: a physical passport of the traveler or physical travel document(s) of the traveler;
    storing at least a portion of the virtual travel credential in a mobile device carried by the traveler;
    monitoring a location of the mobile device; and
    in response to the mobile device transitioning from a first country/territory to a second country/territory, providing a signal to an embassy or consulate corresponding to a home country of the traveler in the second country/territory and providing another signal to an embassy or consulate corresponding to the home country of the traveler in the first country/territory.

2. A method, according to claim 1, wherein monitoring the location of the mobile device includes detecting a cellular network in communication with the mobile device.

3. A method, according to claim 1, wherein monitoring the location of the mobile device includes using GPS functionality of the mobile device.

4. A method, according to claim 1, wherein monitoring the location of the mobile device includes receiving information that the traveler boarded a plane headed for the second country/territory.

5. A method, according to claim 1, wherein at least a portion of the virtual travel credential is stored in a virtual travel credential server that is separate from the mobile device.

6. A method, according to claim 5, wherein the virtual travel credential server communicates with the mobile device using a cellular network.

7. A method, according to claim 5, wherein the virtual credential travel server provides the signal and the another signal in response to the mobile device transitioning from the first country/territory to the second country/territory.

8. A method, according to claim 1, wherein the signal provided to the embassy or consulate in the second country/territory indicates that the traveler is located in the second country/territory so that, in response to the traveler losing the physical passport or the physical travel document(s), the embassy or consulate in the second country/territory is enabled to at least partially rely on the signal in issuing a replacement.

9. A method, according to claim 1, wherein the another signal provided to the embassy or consulate in the first country/territory indicates that the traveler is no longer located in the first country/territory.

10. A non-transitory computer readable medium containing software that maintains information for a traveler, the software comprising executable code that implements steps of:
creating a virtual travel credential containing information from at least one of: a physical passport of the traveler or physical travel document(s) of the traveler;
storing at least a portion of the virtual travel credential in a mobile device carried by the traveler;
monitoring a location of the mobile device; and
in response to the mobile device transitioning from a first country/territory to a second country/territory, providing a signal to an embassy or consulate corresponding to a home country of the traveler in the second country/territory, the signal including the virtual travel credential, and providing another signal to an embassy or consulate corresponding to the home country of the traveler in the first country/territory.

11. The non-transitory computer readable medium, according to claim 10, wherein monitoring the location of the mobile device includes detecting a cellular network in communication with the mobile device.

12. The non-transitory computer readable medium, according to claim 10, wherein monitoring the location of the mobile device includes using GPS functionality of the mobile device.

13. The non-transitory computer readable medium, according to claim 10, wherein monitoring the location of the mobile device includes receiving information that the traveler boarded a plane headed for the second country/territory.

14. The non-transitory computer readable medium, according to claim 10, wherein the software comprises executable code that further implements a step of storing at least a portion of the virtual travel credential in a virtual travel credential server that is separate from the mobile device.

15. The non-transitory computer readable medium, according to claim 10, wherein the signal provided to the embassy or consulate in the second country/territory indicates that the traveler is located in the second country/territory so that, in response to the traveler losing the physical passport or the physical travel document(s), the embassy or consulate in the second country/territory is enabled to at least partially rely on the signal in issuing a replacement.

16. The non-transitory computer readable medium, according to claim 10, wherein the another signal provided to the embassy or consulate in the first country/territory indicates that the traveler is no longer located in the first country/territory.

17. A non-transitory computer readable medium containing software that maintains information for a traveler, the software comprising executable code that implements steps of:
creating a virtual travel credential containing information from at least one of: a physical passport of the traveler or physical travel document(s) of the traveler;
storing at least a portion of the virtual travel credential in a mobile device carried by the traveler;
monitoring a location of the mobile device, wherein monitoring the location of the mobile device includes at least one of using GPS functionality of the mobile device or detecting a cellular network in communication with the mobile device; and
in response to at least one of the GPS functionality of the mobile device indicating that the mobile device is transitioning from a first country/territory to a second country/territory or detecting that the mobile device has connected to a cellular network associated with the second country/territory, providing a signal to an embassy or consulate corresponding to a home country of the traveler in the second country/territory and providing another signal to an embassy or consulate corresponding to the home country of the traveler in the first country/territory.

18. The non-transitory computer readable medium, according to claim 17, wherein the software comprises executable code that further implements a step of storing at least a portion of the virtual travel credential in a virtual travel credential server that is separate from the mobile device.

19. The non-transitory computer readable medium, according to claim 17, wherein the signal provided to the embassy or consulate in the second country/territory indicates that the traveler is located in the second country/territory so that, in response to the traveler losing the physical passport or the physical travel document(s), the embassy or consulate in the second country/territory is enabled to at least partially rely on the signal in issuing a replacement.

20. The non-transitory computer readable medium, according to claim 17, wherein the another signal provided to the embassy or consulate in the first country/territory indicates that the traveler is no longer located in the first country/territory.

* * * * *